US012301732B2

(12) United States Patent
Van Duren

(10) Patent No.: US 12,301,732 B2
(45) Date of Patent: May 13, 2025

(54) MANAGING AN UNMANNED AERIAL VEHICLE IDENTITY

(71) Applicant: QUALCOMM Incorporated, San Diego, CA (US)

(72) Inventor: Drew Foster Van Duren, Templeton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/482,517

(22) Filed: Sep. 23, 2021

(65) Prior Publication Data

US 2022/0345321 A1    Oct. 27, 2022

Related U.S. Application Data

(60) Provisional application No. 63/180,502, filed on Apr. 27, 2021.

(51) Int. Cl.
*H04L 9/32*         (2006.01)
*H04L 9/40*         (2022.01)
(Continued)

(52) U.S. Cl.
CPC .......... *H04L 9/3268* (2013.01); *H04L 9/3236* (2013.01); *H04L 9/3247* (2013.01);
(Continued)

(58) Field of Classification Search
CPC ... H04L 9/3268; H04L 9/3236; H04L 9/3247; H04L 63/0823; H04L 9/0643;
(Continued)

(56) References Cited

U.S. PATENT DOCUMENTS 9,412,278 B1    8/2016  Gong et al.
9,646,502 B1    5/2017  Gentry
(Continued)

FOREIGN PATENT DOCUMENTS

CN      112073964 A     12/2020
WO      2016160593 A1   10/2016

OTHER PUBLICATIONS

Anas et al., "Privacy-Preserving Authentication Framework for UAS Traffic Management Systems," 2017, pp. 1-8. (Year: 2020).*
(Continued)

*Primary Examiner* — Luu T Pham
*Assistant Examiner* — Canh Le
(74) *Attorney, Agent, or Firm* — Polsinelli LLP

(57) ABSTRACT

In embodiments of systems and methods for managing an unmanned aerial vehicle (UAV) identity, a processor of a network computing device may generate an anonymity token that is associated with a digital certificate of a UAV, provide the anonymity token to the UAV for use in operations, receive a request to authenticate the UAV, wherein the request includes the anonymity token, determine whether the anonymity token included in the request is associated with the digital certificate, and send an indication that the UAV is authenticated responsive to the request in response to determining that the anonymity token included in the request is associated with the digital certificate.

21 Claims, 18 Drawing Sheets

(51) Int. Cl.
*H04W 4/40* (2018.01)
*H04W 12/02* (2009.01)
*H04W 12/069* (2021.01)

(52) U.S. Cl.
CPC ........... *H04L 63/0823* (2013.01); *H04W 4/40* (2018.02); *H04W 12/02* (2013.01); *H04W 12/069* (2021.01)

(58) Field of Classification Search
CPC . H04L 9/3265; H04L 2209/80; H04L 63/302; H04L 9/006; H04W 4/40; H04W 12/02; H04W 12/069; H04W 12/80; G06F 21/33
See application file for complete search history.

(56) References Cited

U.S. PATENT DOCUMENTS

| | | | |
|---|---|---|---|
| 9,764,836 B1* | 9/2017 | Elzinga | B64U 80/70 |
| 9,805,273 B1 | 10/2017 | Seeber et al. | |
| 2009/0198618 A1* | 8/2009 | Chan | G06Q 20/02 |
| | | | 707/E17.014 |
| 2014/0327564 A1 | 11/2014 | Sampigethaya | |
| 2016/0274578 A1 | 9/2016 | Arwine | |
| 2016/0292696 A1* | 10/2016 | Gong | H04L 67/12 |
| 2020/0008059 A1* | 1/2020 | Fox | H04W 12/06 |
| 2020/0092110 A1 | 3/2020 | Zhang et al. | |
| 2020/0195439 A1* | 6/2020 | Suresh | H04L 9/3213 |
| 2020/0205211 A1* | 6/2020 | Hong | B64C 39/024 |
| 2020/0249673 A1* | 8/2020 | Fleishman | G06K 19/06065 |
| 2020/0374131 A1* | 11/2020 | Davis | H04L 9/50 |
| 2020/0403780 A1* | 12/2020 | Ståhl | H04L 63/062 |
| 2021/0243038 A1 | 8/2021 | Wilson | |
| 2022/0198373 A1 | 6/2022 | Rauhala et al. | |
| 2022/0210644 A1* | 6/2022 | Maher | H04W 60/00 |
| 2022/0279355 A1* | 9/2022 | Roy | H04W 60/04 |
| 2022/0345453 A1 | 10/2022 | Van Duren | |
| 2023/0009304 A1* | 1/2023 | Jakobsson | G06Q 30/0241 |
| 2023/0044476 A1* | 2/2023 | Lei | H04L 63/0807 |
| 2023/0133187 A1* | 5/2023 | Ferdi | H04L 63/08 |
| | | | 455/411 |

OTHER PUBLICATIONS

Fabio et al., "Hybrid Model for Secure Communications and Identity Management in Vehicular Ad Hoc Networks," 2017, pp. 1-9 (Year: 2017).*

Alsoliman A., et al., "Privacy-Preserving Authentication Framework for UAS Traffic Management Systems", 2020 4th Cyber Security in Networking Conference (CSNET), IEEE, Oct. 21, 2020 (Oct. 21, 2020), 8 Pages, XP033898467, DOI: 10.1109/CSNET50428.2020.9265534, [retrieved on Nov. 20, 2020], Abstract p. 1, left-hand column, paragraph I. Introduction-p. 2, right-hand column p. 6, left-hand column, paragraph V. B. Authentication Phase—right-hand column.

International Search Report and Written Opinion—PCT/US2022/017603—ISA/EPO—May 13, 2022; 15 pages.

International Search Report and Written Opinion—PCT/US2022/017611—ISA/EPO—May 9, 2022; 16 pages.

* cited by examiner

MANAGING AN UNMANNED AERIAL VEHICLE IDENTITY

This application claims the benefit of priority to U.S. Provisional Application No. 63/180,502 entitled "Managing An Unmanned Aerial Vehicle Identity" filed Apr. 27, 2021, the entire contents of which are hereby incorporated by reference for all purposes.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

An Unmanned Aerial System Traffic Management (UTM) is under development to function as a traffic management ecosystem for unmanned aerial vehicles (UAV) operations that is separate from, but complementary to, Air Traffic Management (ATM) systems. In many operational scenarios, communications from UAVs require digital certificates to enable receiving devices to authenticate information sent from the UAV. For example, airborne applications such as Remote ID and Detect and Avoid messaging may require trusted, authenticated messages signed by a private cryptographic key that may be cryptographically verified (e.g., using its public key certificate).

A typical digital certificate provided by a UAV may include identifiers of the UAV and its operator, which may enable tracking of the UAV and correlation with a known operator or organization. Some UAV operators by nature of their identity, role, or mission may require operator privacy, but must still sign and broadcast authenticatable messages for safety and other operational purposes.

SUMMARY

Various aspects include systems and methods performed by a processor of a network computing device for managing a UAV identity. Various aspects may include generating an anonymity token that is associated with a digital certificate of a UAV, providing the anonymity token to the UAV for use in operations, receiving a request to authenticate a UAV message, wherein the request includes the anonymity token and a digital signature associated with the UAV message, identifying the digital certificate using the anonymity token included in the request, determining whether the digital signature is verified using the digital certificate, and sending an indication that the UAV message is authenticated responsive to the request in response to determining that the digital signature is verified using the digital certificate.

In some aspects, the anonymity token may include a cryptographically verifiable indication that the anonymity token is associated with the digital certificate. In some aspects, the anonymity token may include an indication that the UAV is entitled to perform operations anonymously. In some aspects, the digital certificate may include an indication that the UAV is entitled to perform operations anonymously. In some aspects, the anonymity token may be associated with a usability time limitation. In some aspects, the anonymity token may be associated with a usability geographic limitation. In some aspects, the anonymity token may include a hash of the digital certificate. In some aspects, the anonymity token may include a hash of the digital certificate concatenated with a secret value.

In some aspects, generating the anonymity token that is associated with the digital certificate of the UAV may include generating the anonymity token from one of a hash of the digital certificate, a keyed hash of the digital certificate, or a keyed hash tree of the digital certificate. In some aspects, generating the anonymity token that is associated with a digital certificate of a UAV may include generating a plurality of anonymity tokens that are associated with the digital certificate, wherein each of the plurality of anonymity tokens is associated with a usability time limitation, and providing the anonymity token to the UAV for use in operations may include providing the plurality of anonymity tokens to the UAV for use in operations, in which the use of each anonymity token is limited by the respective usability time limitation. In some aspects, generating a plurality of anonymity tokens that are associated with the digital certificate may include generating a plurality of anonymity tokens using a keyed hash tree.

Further aspects include a network computing device having a processing system configured to perform one or more operations of any of the methods summarized above. Further aspects include processing devices for use in a network computing device configured with processor-executable instructions to perform operations of any of the methods summarized above. Further aspects include a non-transitory processor-readable storage medium having stored thereon processor-executable instructions configured to cause a processor of a network computing device to perform operations of any of the methods summarized above. Further aspects include a network computing device having means for performing functions of any of the methods summarized above.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
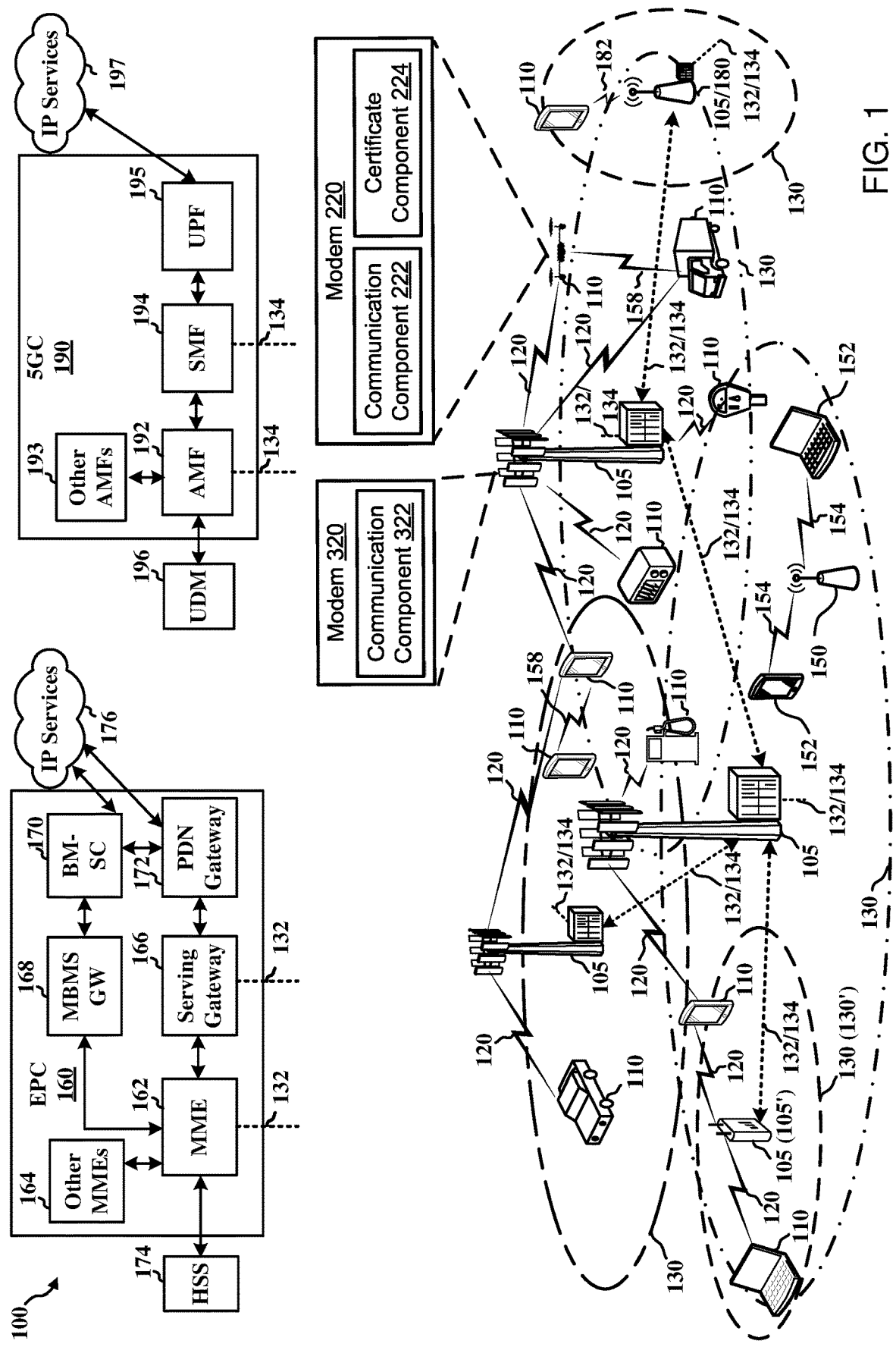
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In an implementation, a UAV may partition a certificate into segments. The UAV may embed each segment of the certificate into a frame. The frames containing the segments of the partition may be sequentially transmitted by the UAV. The UAV may transmit a broadcast remote identification. Receivers of the broadcast remote identification and/or the certificate segments may append the certificate segments into a certificate to be used to authenticate the broadcast remote identification.

In an implementation, the broadcast remote identification may be a mobile identification (associated with the mobile device or UAV) declared during the broadcasting process. In other instances, the broadcast remote identification may be the certificate associated to or containing the mobile identification. The mobile identification may be a serial number, a government issued identifier, a universal unique identification, etc.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods performed by network computing devices and base stations to manage an identity of a UAV. Various embodiments may be used to enable UAVs and base stations to perform operations without transmitting certain identification information that may enable the UAV to be tracked, or to be correlated with a particular UAV operator, while transmitting information required for safety and other purposes.

While the description refers to a UAV for conciseness, it will be understood that a UAV may include one of various types of vehicles including an onboard computing device configured to provide some autonomous or semi-autonomous capabilities. Examples of such vehicles include but are not limited to: aerial vehicles, such as UAVs; ground vehicles (e.g., an autonomous or semi-autonomous car, a vacuum robot, etc.); water-based vehicles (i.e., vehicles configured for operation on the surface of the water or under water); and/or some combination thereof. In some embodiments, the vehicle may be manned. In other embodiments, the vehicle may be unmanned. In embodiments in which the vehicle is autonomous, the vehicle may include an onboard computing device configured to maneuver and/or navigate the vehicle without remote operating instructions (i.e., autonomously), such as from a human operator (e.g., via a remote computing device). In embodiments in which the vehicle is semi-autonomous, the vehicle may include an onboard computing device configured to receive some information or instructions, such as from a human operator (e.g., via a remote computing device), and autonomously maneuver and/or navigate the vehicle consistent with the received information or instructions. In some implementations, the vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the vehicle. Specific non-limiting examples of rotorcraft include tricopters (three rotors), quadcopters (four rotors), hexacopters (six rotors), and octocopters (eight rotors). However, a rotorcraft may include any number of rotors. A vehicle may include a variety of components and/or payloads that may perform a variety of functions. The term "components" when used with respect to a vehicle includes vehicle components and/or vehicle payloads.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Typically, communications from UAVs are required to include a digital certificate that enables receiving devices to authenticate information sent from the UAV. Such communications may include, for example, intended maneuvers and other flight operations, observations of other traffic and of the environment, and so forth. Requiring such communications to be digitally signed enables the authentication of the source of such information. A typical UAV digital certificate is static, and may include identifiers of the UAV and its operator, which may enable tracking of the UAV and/or correlation with a known operator or organization. As noted above, some UAV operators by nature of their identity, role, or mission may desire the ability to operate UAVs anonymously, while still signing and transmitting authenticatable messages for safety and other operational purposes.

Various embodiments include methods and network computing devices and base stations configured to implement the methods managing a UAV identity. In various embodiments, a UAV may be configured with an entitlement or a permission to perform operations without transmitting certain identifying information of the UAV or its operator that may enable tracking of the UAV, or correlation of the UAV to its operator. An example of such identifying information is a digital certificate of, or associated with, the UAV. As used herein, performing operations without transmitting such identifying information is referred to as performing operations "anonymously." In various embodiments, when a UAV is operating anonymously, the UAV may be configured to send a message (e.g., a digitally signed message) without such identifying information (such as a digital signature). Further, devices that receive such messages (e.g., a digitally signed message) from the UAV will not be provisioned or provided the information identifying the UAV (e.g., the digital signature). Moreover, elements of the UTM, such as base stations, may configure messages with information about the UAV without identity information of the UAV, such as the digital signature of the UAV. For example, certain operators, such as law enforcement or military agencies, may need to operate UAVs anonymously from time to time, such as to perform traffic observation, surveillance operations, and the like. As another example, a commercial package delivery operator may obtain permission to operate some UAVs anonymously to protect confidential business operations from observation, to deliver packages confidentially (such as confidential legal, medical, or business documents; pharmaceutical prescriptions; medical instruments or devices; medical samples for testing; organs for transplant; etc.), and the like.

Various embodiments may include methods and devices configured to perform the methods for managing a UAV identity to enable a UAV to perform operations anonymously. In various embodiments, a UAV may be associated with or may be issued a digital certificate (e.g., by a certificate authority or another suitable issuer). A network computing device (such as a server) may be configured to generate an anonymity token that is associated with the digital certificate of a UAV. In some embodiments, the network computing device may provide the anonymity token to the UAV for use in operations. In some embodiments, the network computing device may generate the anonymity token using a hash of the digital certificate. In some embodiments, the network computing device may generate the anonymity token using a keyed hash of the digital certificate. In some embodiments, the network computing device may generate the anonymity token using a keyed hash tree of the digital certificate.

The UAV may be configured with the anonymity token, and the UAV may associate the anonymity token with a transmission (referred to herein as a "UAV message"). The anonymity token may enable a receiver to request authentication of the transmission and/or the transmitting UAV without receiving identifying information of the UAV and/or the UAV operator. In some embodiments, the UAV may digitally sign the UAV message using a cryptographic key associated with the UAV. In some embodiments, the anonymity token may include a cryptographically verifiable indication that the anonymity token is associated with the UAV's digital certificate. In some embodiments, the anonymity token may include an indication that the UAV (and/or the UAV operator) is entitled to perform operations anonymously.

In some embodiments, the network computing device may receive a request to authenticate a UAV message. For example, the network computing device may receive the request from UTM infrastructure, such as a base station or other network access point, from another UAV, from receiving device such as a ground station, smartphone, or other suitable device, and/or the like. In some embodiments, the request may include the anonymity token and a digital signature associated with the UAV message. In some embodiments, the request may include message information that has been signed with the digital signature (sometimes referred to as "signed data"). The network computing device may identify the digital certificate using the anonymity token included in the request. For example, the network computing device may identify a digital certificate that is associated with the anonymity token. In some embodiments, an association between a digital certificate and one or more anonymity tokens may be stored in a memory or memory device accessible by the network computing device.

In some embodiments, the network computing device may determine whether the digital signature is verified using the digital certificate. In some embodiments, the network computing device may use the digital certificate to perform a verification of the digital signature. In some embodiments, the network computing device may use the digital certificate to cryptographically verify the digital signature. In some embodiments, cryptographic verification of the digital signature using the digital certificate may indicate that UAV message is authentic and/or that the sending UAV may be considered a trusted source. In some embodiments, the network computing device may send an indication that the message is authenticated responsive to the request in response to determining that the digital signature is verified using the digital certificate.

In some embodiments, the anonymity token may include a cryptographically verifiable indication that the anonymity token is associated with the digital signature. In some embodiments, the anonymity token may include a hash of the digital certificate. In some embodiments, the anonymity token may include a portion of a hash of the digital certificate. In some embodiments, the anonymity token may include a hash of the digital certificate that is concatenated with the secret value. In some embodiments, the network computing device may use such a hash of the digital certificate (or the hash concatenated with the secret value) to obtain (e.g., to lookup) the digital certificate. In various embodiments, the data structure of the anonymity token may configured to include a variety of encoded information and/or associations to other data, without limitation.

In some embodiments, the anonymity token may be associated with a usability time limitation. For example, the anonymity token may be associated with a time-to-live or another temporal restriction on its usability that limits the usefulness of the anonymity token to a specified time range or duration, outside of which the UAV would be unable to use the anonymity token to perform operations anonymously. In some embodiments, the anonymity token may include, or be associated with, an encoding of the usability time limitation. In some embodiments, the network computing device may determine the association of the anonymity token and the usability time limitation, for example, by reference to information stored in a data structure such as a database.

In some embodiments, the anonymity token may be associated with a usability geographic limitation. For example, the anonymity token may be associated with a geofence, coordinates, or another geographic restriction on its usability that limits the usefulness of the anonymity token to a specified location, area, or physical region, such as may correspond to a legal jurisdiction, a theater of operation, a specified delivery route or travel path, or the like, outside of which the UAV would be unable to use the anonymity token to perform operations anonymously. In some embodiments, the anonymity token may include, or be associated with, an encoding of the usability geographic limitation. In some embodiments, the network computing device may determine the association of the anonymity token and about usability geographic limitation, for example, by reference to information stored in a database or other suitable data structure.

In some embodiments, in order to enhance the UAV's ability to perform operations anonymously, the network computing device may generate a plurality of anonymity tokens that are associated with the digital certificate of the UAV, and the plurality of anonymity tokens may be configured in (e.g., uploaded to and stored in) memory of the UAV. In some embodiments, the plurality of anonymity tokens may be associated cryptographically with the digital certificate. For example, each anonymity token may be associated with a single certificate or with a unique certificate. In such embodiments, the association between each anonymity token and digital certificate may be maintained by the network computing device. In some embodiments, the network computing device may generate a plurality of anonymity tokens using a hash of the digital certificate. In some embodiments, the network computing device may generate a plurality of anonymity tokens using a keyed hash of the digital certificate. In some embodiments, the network computing device may generate a plurality of anonymity tokens using a keyed hash tree of the digital certificate. In some embodiments, the network computing device may maintain a secret key used by the network computing device in a keyed hashing process to produce the plurality of anonymity tokens. In some embodiments, the UAV may rotate through its plurality of anonymity tokens for inclusion in one or more transmissions. In some embodiments, the UAV may select an anonymity token randomly from among the plurality of anonymity tokens for use in transmissions. In some embodiments, each of the plurality of anonymity tokens may be configured with a usability time limitation. In some embodiments, each of the plurality of anonymity tokens may be limited to use in a single transmission (i.e., one-time-use). In this manner, the UAV may transmit messages that are authenticatable and anonymous as to the identity of the UAV and/or its operator.

In various embodiments, a base station, access point, or other device that provides a wireless communication link and supports access to a communication network (referred to herein collectively as a "base station" for conciseness) may be configured to perform methods for managing a UAV) identity. In some embodiments, the base station may be configured to receive from a UAV an assertion that the UAV is entitled to perform operations anonymously. In some embodiments, the assertion may include an anonymity token or digital certificate, and the anonymity token or digital certificate may include an indication (such as information including the assertion) that the UAV is entitled to perform operations anonymously. In some embodiments, the assertion may include a message and an anonymity token. In some embodiments, the digital signature is performed over the message and the anonymity token. In some embodiments, the assertion may include an attribute or a data structure pointer to information indicating that the UAV is entitled to perform operations anonymously. A data structure pointer may be a record locator or other suitable information pointing to a location of information in a data structure, such as a database. In some embodiments, such a database may be managed by or accessible by the network computing device. In some embodiments, the anonymity token included in the assertion may be the product of a cryptographic process, such as a hash of a digital certificate. The cryptographic process may enable the anonymity token to be unambiguously associated with a digital signature that is associated with the UAV. In some embodiments, the anonymity token may include a cryptographically verifiable indication that the anonymity token is associated with a digital certificate of the UAV.

In some embodiments, the base station may send to a network computing device a request to authenticate the UAV, in which the request includes the assertion and a digital signature performed over the assertion. In some embodiments, the digital signature may include signed data originally sent from the UAV. The base station may receive a response from the network computing device indicating whether the UAV is entitled to perform operations anonymously. Based on the response from the network computing device, the base station may determine whether the UAV is entitled to operate anonymously. In response to determining that the UAV is entitled to operate anonymously, the base station may broadcast information about the UAV that is configured without identity information of the UAV. In some embodiments, the broadcast may additionally include one or more pseudonym certificates associated with anonymity token that other UTM entities may use to authenticate the UAV broadcasts without receiving information about the UAV identity.

The base station may be configured to handle requests from another device asking the base station to authenticate the UAV. Non-limiting examples of another device that may make such requests include another UAV, a receiving device such as a ground station, smartphone, or a UAV controller device, and the like. In some embodiments, the base station may receive a request to authenticate a UAV message, in which the request includes an anonymity token associated with the UAV and the digital signature associated with the UAV that were included in the UAV message. For example, the other device may receive a UAV message from the UAV and extract the assertion in the digital signature or another signed data structure from the UAV message. The other device may include the received assertion and the digital signature in the request (e.g., to the base station) for authentication of the UAV message. In some embodiments, the digital signature may include message data that has been signed with the digital signature.

Upon receiving such a request, the base station may send to a network computing device a request to authenticate the UAV message, in which the request includes the anonymity token and a the digital signature associated with the UAV message (e.g., a digitally signed UAV message, a digital signature generated using the UAV message, etc.). The base station may receive a response from the network computing device indicating whether the UAV message is authenticated. In some embodiments, the base station may determine based on the response from the network computing device whether the UAV message is authenticated. In some embodiments, the base station may relay or pass on an indication received from the network computing device regarding whether the UAV message is authenticated. In this manner, the base station may send an indication that the UAV message is authenticated. In some embodiments, a structure of the digital signature may include the UAV message data. In some embodiments, the digital signature may be generated over the UAV message using a private key of the UAV.

Various embodiments may be implemented in a variety of scenarios. For example, a UAV of a law enforcement agency may perform reconnaissance operations in an area where other UAV's are simultaneously operating, necessitating an exchange of Detect-and-Avoid (DAA) messages to avoid near-misses or collisions with the other UAVs. In non-anonymous operations, the law enforcement UAV drone may either transmit its digital certificate along with a signed DAA message, or may make its digital certificate available to message recipients via UTM infrastructure (e.g., upon request via a base station) such that message receivers may cryptographically verify and trust messages received from the UAV. When the law enforcement UAV performs operations anonymously, the law enforcement UAV may digitally sign transmissions messages with an anonymity token that may be associated with a public key certificate. Further, the law enforcement UAV may send a notification, command, or request to UTM infrastructure (e.g., base stations) not to broadcast the digital certificate associated with the law enforcement UAV. A receiving device that needs to authenticate a transmission received from the UAV may send a request to a base station, or to a remote verification service (e.g., a network computing device), which may perform operations to provide a confirmation or denial of the authentication of the UAV's transmission, while not revealing the identity of the law enforcement UAV or its operator.

As another example, a commercial package delivery UAV operator may desire to operate its UAVs anonymously, for example, to prevent a competitor from analyzing its business operations, or to facilitate the conveyance of sensitive or confidential documents, medicines, medical devices, and the like. To accommodate such situations, the UAV operator may be granted an exemption from transmitting certain static or trackable message content, or otherwise making its certificate available to other entities. Then, when the such an operator's UAV performs operations anonymously, the UAV may digitally sign transmissions associated with an anonymity token that enables authentication of a transmission and/or the UAV and/or the UAV operator, without revealing the identity of the UAV and/or the UAV operator.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the user equipment (UE) 110 may include a communication component 222. The communication component 222 and/or a modem 220 of the UE 110 may be configured to communicate with the BS 105 or other UEs 110 via a cellular network, a Wi-Fi network, or other wireless and wired networks. The UE 110 may include a certificate component 224 that retrieves the certificate, partitions the certificate, and/or embeds the certificate segments into frames. In some implementations, the BS 105 may include a communication component 322 configured to communicate with the UE 110.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some examples, the UE 110 may include, be a part of, or the same as a mobile device, UAV, UAS, etc.

Figure 2:
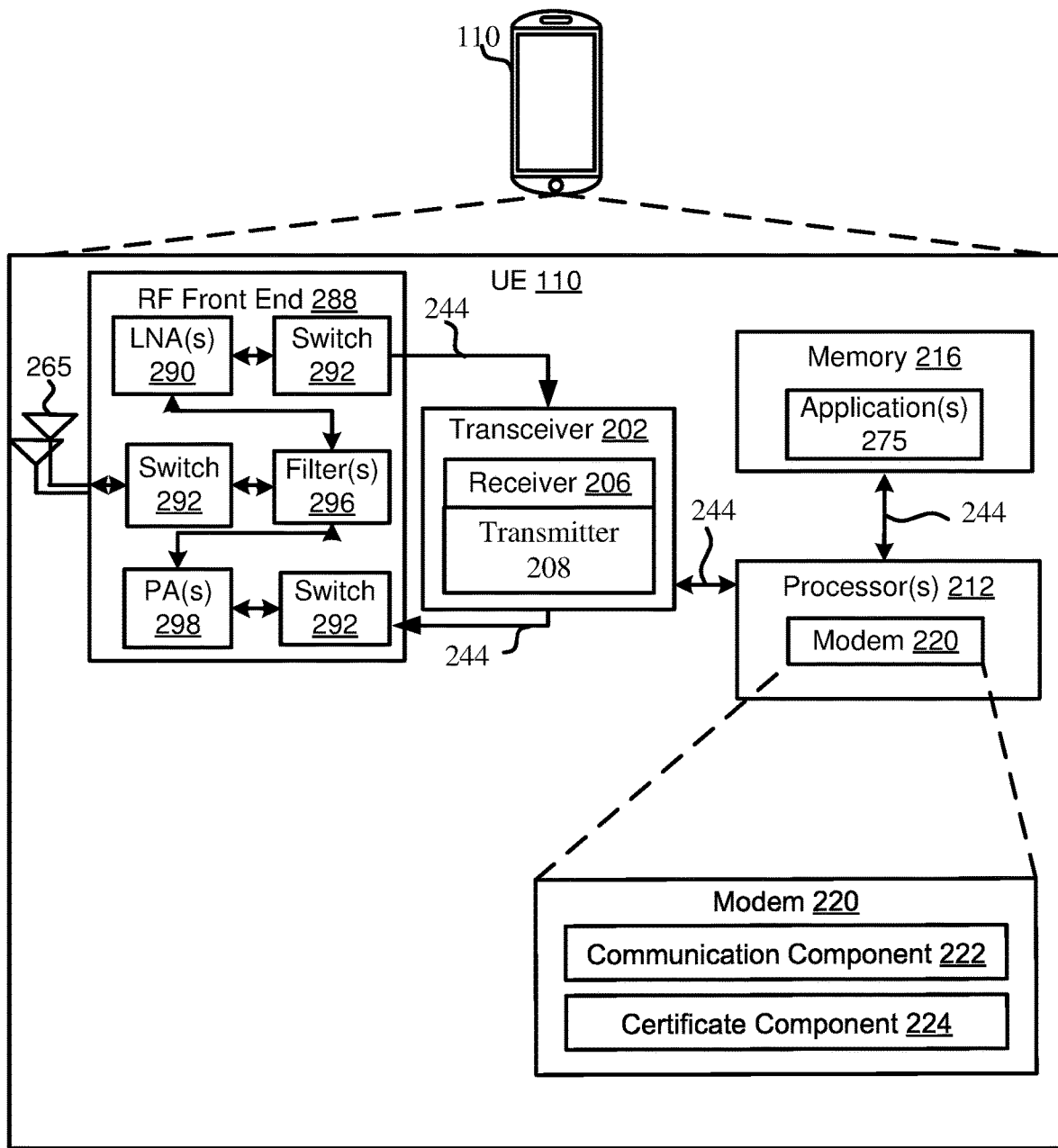
FIG. 2 is a schematic diagram of an example of a user equipment, such as a mobile device or UAV.

Referring to FIG. 2, one example of an implementation of the UE 110 may include a modem 220 having a communication component 222. The communication component 222 and/or the modem 220 of the UE 110 may be configured to communicate with the BS 105 via a cellular network, a Wi-Fi network, or other wireless and wired networks. The certificate component 224 may retrieves the certificate, partitions the certificate, and/or embeds the certificate segments into frames.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the certificate component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 and/or the certificate component 224 may be performed by transceiver 202.

Also, memory 216 may be configured to store data used herein and/or local versions of applications 275 or the communication component 222, the certificate component 224 and/or one or more subcomponents of the communication component 222 and/or the certificate component 224 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the certificate component 224, and/or one or more of its subcomponents, and/or data associated therewith, when UE 110 is operating at least one processor 212 to execute the communication component 222, the certificate component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNA) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
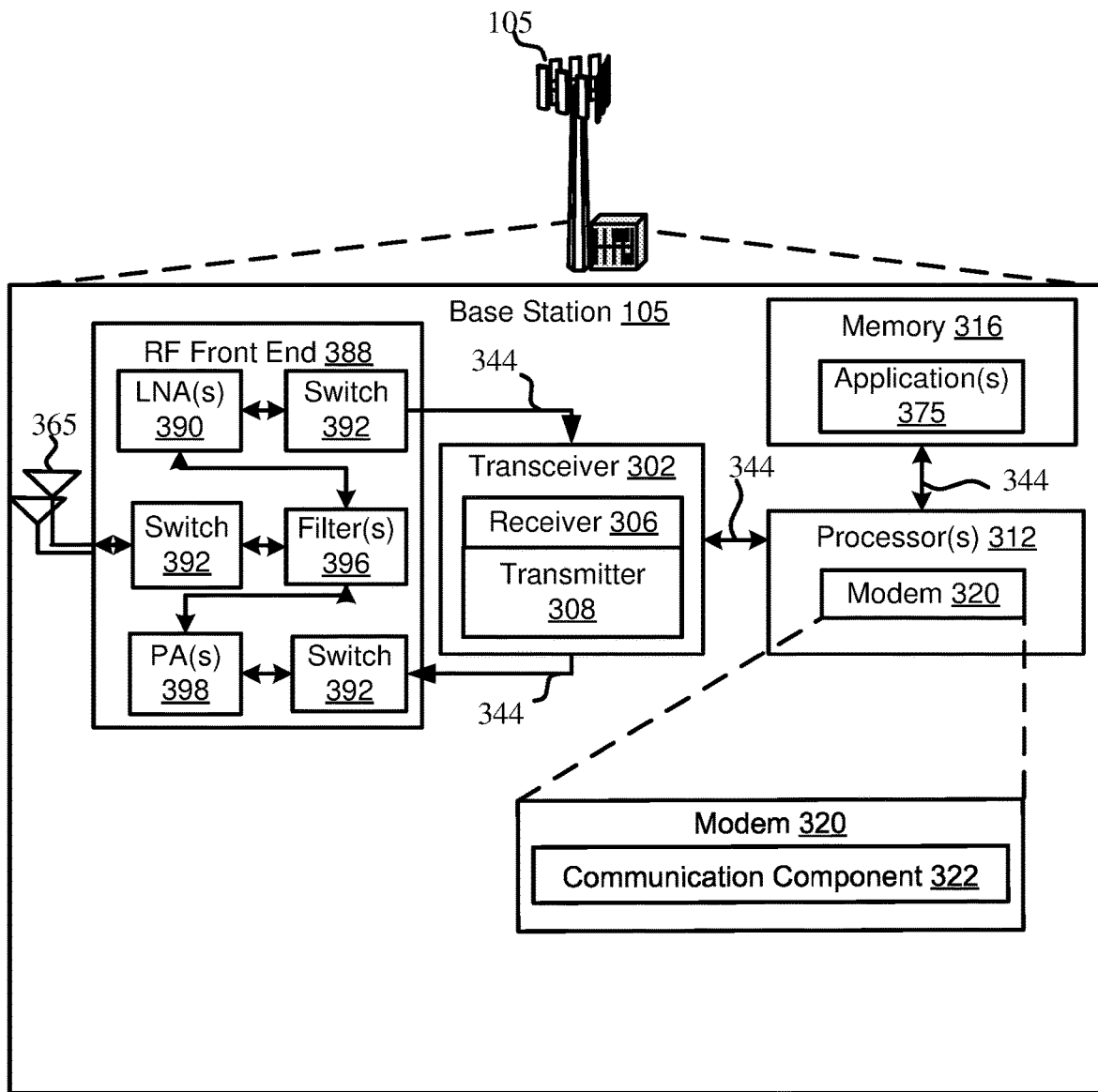
FIG. 3 is a schematic diagram of an example of a base station.

Referring to FIG. 3, one example of an implementation of the BS 105 may include a modem 320 with a communication component 322 configured to transmit data. The communication component 322 and/or the modem 320 the BS 105 may be configured to communicate with the UE 110 via a cellular network, a Wi-Fi network, or other wireless and wired networks.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322, the determination component, and/or one or more subcomponents of the communication component 322 or the determination component being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the determination component, and/or one or more of its subcomponents, and/or data associated therewith, when the BS 105 is operating at least one processor 312 to execute the communication component 322, the determination component, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
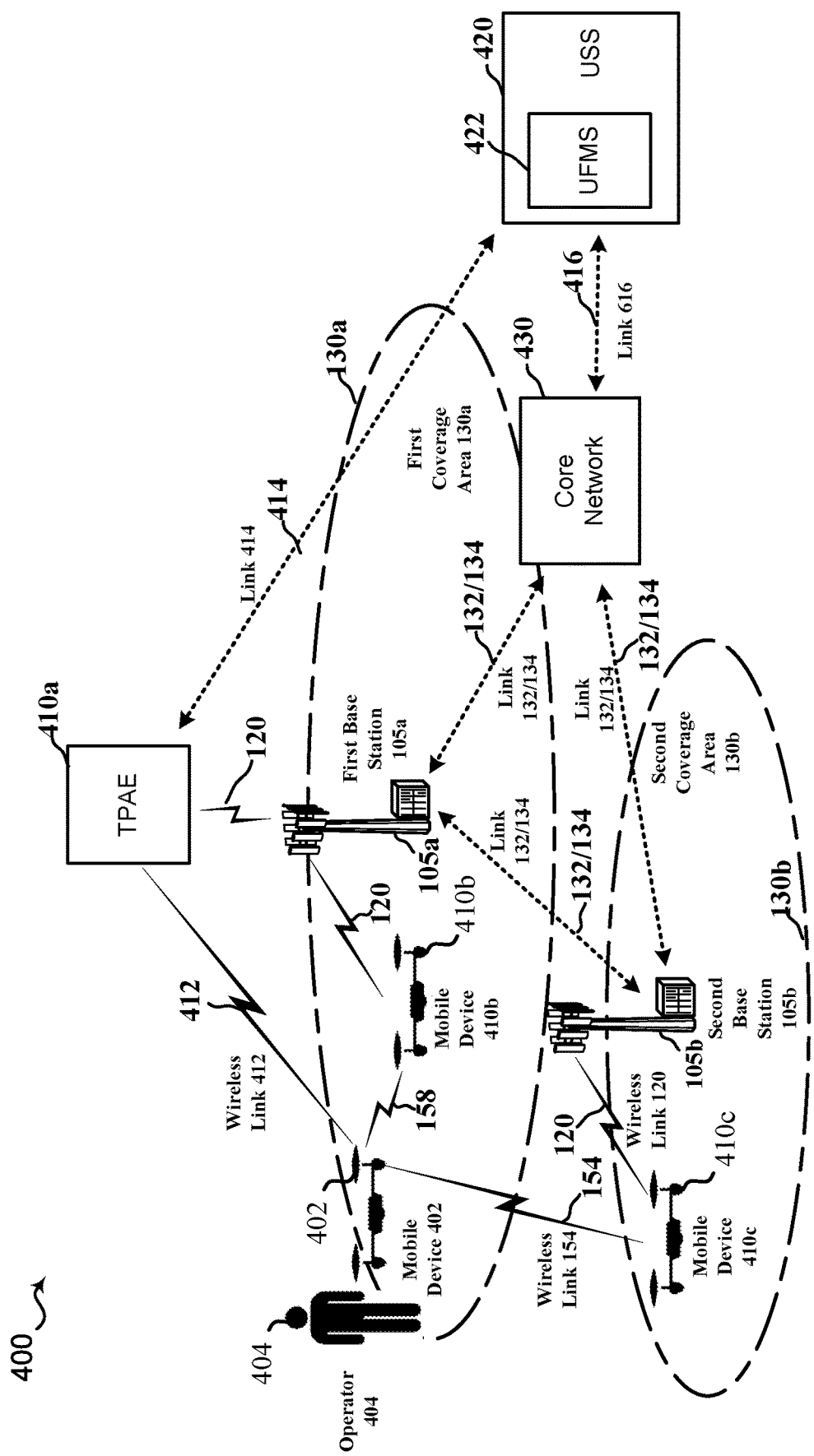
FIG. 4 is a schematic diagram of an example of an environment for managing UAVs.

Turning to FIG. 4, in an implementation, an example of an environment 400 for managing UAVs may include a mobile device 402. The mobile device 402 may include, be part of, or the same as the UE 110. The mobile device 402 may be an UAV, an unmanned aerial system (UAS), a drone, or other apparatuses controllable by a remote operator. The mobile device 402 may be operated by an operator 404 (e.g., a human operator. a machine operator or an artificial intelligence operator). The environment 400 may include a first receiver 410a, a second receiver 410b, and a third receiver 410c. The first receiver 410a may be a third-party authorized entity (TPAE, such as a police detector, civil/governmental detectors, regulatory agencies, etc.). The second receiver 410b and the third receiver 410c may be mobile devices such as UAVs. Other types of receivers are possible. The mobile device 402 may communicate with the first receiver 410a via wireless communication links 412 such as Bluetooth, Wi-Fi, cellular device-to-device link or other wireless communication links. The mobile device 402 may communicate with the second receiver 410b via the D2D communication link 158 such as Bluetooth, Wi-Fi, cellular device-to-device link or other wireless communication links. The mobile device 402 may communicate with the third receiver 410c via the communication links 154 such as Bluetooth, Wi-Fi, cellular device-to-device link or other wireless communication links. Other communication links may be used for communication.

In certain implementations, the environment 400 may include a first BS 105a having a first coverage area 130a and a second BS 105b having a second coverage area 130b. The environment 400 may include a core network 430, such as the EPC 160 or 5GC 190 in FIG. 1. The environment 400 may include a UAV service supplier (USS) 420. The USS 420 may optionally include a UAV flight management system (UFMS) 422. In some optional implementations, the UFMS 422 may be implemented in the core network 430. In other optional implementations, the UFMS 422 may be implemented in a stand-alone server separate from the USS 422. The USS 420 and/or the UFMS 422 may communicate with the first receiver 410a via communication link 414 (e.g., WiFi, long-range radio, cellular link, fiber optics, etc.), or via the core network 430. The USS 420 and/or the UFMS 422 may communicate with the core network 430 via communication interface 416 (e.g., 5GC 190 Network Exposure Function, EPC 160 Service Capability Exposure Function, 3GPP Rx interface, etc.).

In an implementation of the present disclosure, the mobile device 402 may include a remote identification (ID). The remote ID may include one or more information such as UAV ID (e.g., serial number, registration number, or UAV traffic management unique ID, etc.), UAV type, timestamp, timestamp accuracy, operational status, operation description, latitude, longitude, geodetic altitude, height above takeoff, pressure altitude of position, vertical accuracy, horizontal accuracy, speed (north/south), speed (east/west), vertical speed, operator latitude, operator longitude, etc. The remote ID may be dynamically updated during operation of the mobile device 402. The mobile device 402 may obtain some or all the information (e.g., the UAV ID) in the remote ID from the USS 420 and/or the UFMS 422 via the cellular network (e.g., the first BS 105a, the second BS 105b, etc.).

In some implementations, the remote ID may include a network remote ID (NRID) and a broadcast remote ID (BRID). The NRID and/or the BRID may include some or all of the information of the remote ID. In one example, the BRID may include the UAV ID and location information.

In one implementation, a cryptographic hash/digest of the BRID is identical to the UAV ID or an index to the UAV ID.

In one aspect of the present disclosure, the mobile device 402 may broadcast the BRID to one or more of the first receiver 410a, the second receiver 410b, and/or the third receiver 410c. In order to enable the first receiver 410a, the second receiver 410b, and/or the third receiver 410c to authenticate the BRID, the mobile device 402 may transmit (e.g., unicast, multicast, or broadcast) a certificate. The certificate may be a certificate of the mobile device 402, a certificate from a certificate authority that assigned the certificate of the mobile device 402, or a trust chain file indicating one or more hierarchies of certificates, each up to a root certificate or other designated authority. The mobile device 402 may partition the certificate into n parts, and may transmit the n parts of the certificate in n frames. For example, the mobile device 402 may partition the certificate into 20 parts (n=20). The mobile device 402 may embed the 20 certificate partitions/segments into 20 frames, and sequentially transmit the 20 frames to one or more of the first receiver 410a, the second receiver 410b, and/or the third receiver 410c. For example, frame 1 may include part 1 of the certificate, frame 2 may include part 2 of the certificate, and so forth. Once a receiver (e.g., the first receiver, the second receiver, and/or third receiver) receives all of the frames (e.g., 20 frames), the receiver (e.g., . . . ) may concatenate the parts of the certificate (e.g., 20 parts of the 20 frames) to generate or form the certificate (e.g., certificate of mobile device 402).

In some circumstances, using the certificate to authenticate the BRID may allow the receivers 410a-410c to simultaneously verify the authenticity of the mobile device 402.

In some aspects, the mobile device 402 may indicate to the receivers 410a-c the number of parts (or frames) for the certificate. For example, the mobile device 402 may partition the certificate into 50 parts and embed the 50 parts into 50 frames. The mobile device 402 may indicate in the first frame (containing the first part of the certificate) that there are 50 parts of the certificate that will be transmitted. In response, the receivers 410a-c may assemble the certificate after receiving the 50 parts in 50 frames.

In another aspect, the mobile device 402 may indicate to the receivers 410a-c the last frame carrying the last part of the certificate. For example, the mobile device 402 may partition the certificate into 15 parts and embed the 15 parts into 15 frames. The mobile device 402 may indicate in the $15^{th}$ frame that it is the last frame carrying the parts of the certificate. In response, the receivers 410a-c may assemble the certificate after receiving the $15^{th}$ frame (having the $15^{th}$ or last part).

In some aspects, the frames carrying the parts of the certificate may be labeled as a certificate frame.

In certain aspects, the number of frames used for transmitting the parts of the certificate (i.e., segments) may be dynamically determined based on factors such as weather conditions, traffic, regulatory requirements, technology used for transfer, etc.

In some implementations, after the receivers 410a-c concatenates the certificate from the parts of the certificate, the receivers 410a-c may use the certificate to authenticate the BRID and/or other messages transmitted by the mobile device 402.

In certain aspects, the mobile device 402 may transmit the frames carrying the parts of the certificate at a certain periodicity. Examples of the periodicity may include 50 millisecond (ms), 100 ms, 500 ms, 1 second (s), 5 s, 10 s, 50 s, 100 s, or other durations. The periodicity may be determined by various methods described below.

In one aspect of the present disclosure, the mobile device 402 may receive a security profile (e.g., IEEE 1609.2 Security Profile). The mobile device 402 may receive the security profile during installation, programming, setup, initialization, or registration of the mobile device 402. The security profile may indicate the periodicity to transmit the frames carrying the parts of the certificate.

In another aspect of the present disclosure, the mobile device 402 may receive the periodicity value when connected to the first BS 105a, the second BS 105b, the UFMS 422, and/or the USS 420. For example, when the USS 420 and/or the UFMS 422 provides the UAV ID to the mobile device 402, the USS 420 and/or the UFMS 422 may transmit the periodicity to the mobile device 402. In other examples, the periodicity may be embedded in the UAV ID when the USS 420 and/or the UFMS 422 provides the UAV ID to the mobile device 402.

In a different aspect, the first BS 105a serving the mobile device 402 may transmit the periodicity to the mobile device 402 via a radio resource configuration (RRC) message or a system information broadcast (SIB) message. The periodicity transmitted may be a value (e.g., 1 s, 2 s, 5 s, 10 s, 20 s, 50 s, 100 s, etc.) or one of a set of predefined indices (e.g., 0-never, 1-5 s, 2-10 s, 3-20, etc.).

In some aspects of the present disclosure, the first BS 105a serving the mobile device 402 may update the periodicity of the mobile device 402 dynamically via a RRC message. The first BS 105a may transmit a RRC message to the mobile device 402 to change the periodicity to transmit the frames carrying the parts of the certificate from, e.g., 10 s to 15 s.

In one implementation, the periodicity may be a function of the flight plan of the mobile device 402, geographical areas along the light plan, local/regional/national policy, traffic density, topographical interference, or other factors relevant to the operation of the mobile device 402.

In some implementations, the periodicity may be adaptively based on detected environmental factors such as RF interference from other UAV traffic, weather-related attenuation, excessive requests for certificate, etc. In certain implementations, the periodicity may be determined based on the received signal strength indication (RSSI), the radio frequency, one or more network or link quality of service (QoS) parameters, or other factors associated with the quality of the communication channel.

In an aspect of the present disclosure, the receivers 410a-c may obtain the certificate from sources other than the mobile device 402. In a first example, the USS 420 and/or the UFMS 422 may provide the certificate to the core network 430. The core network 430 may determine the geographical location of the mobile device 402 based on the location information (e.g., latitude, longitude, altitude, etc.) in the remote ID, the BRID, or the NRID. The core network 430 may determine the one or more coverage areas and corresponding base stations associated with the geographical location, such as the first BS 105a and the first coverage area 130a. The core network 430 may provide the certificate to the first BS 105a after determining that the mobile device 402 is within the first coverage area 130a. The mobile device 402 may broadcast the BRID. After the mobile device 402 broadcasts the BRID, the second receiver 410b may receive the BRID from the mobile device 402. The second receiver 410b may obtain information, such as the UAV ID of the mobile device 402, from the BRID. The second receiver 410b may transmit a certificate request, including the UAV ID, to the first BS 105a (the serving base station for the second receiver 410b). In response, the first BS 105a may transmit a certificate response including the certificate (received earlier from the core network 430) to the second receiver 410b. The second receiver 410b may use the certificate to authenticate the BRID from the mobile device 402.

In a second example, the mobile device 402 may broadcast the BRID. After the mobile device 402 broadcasts the BRID, the second receiver 410b may receive the BRID from the mobile device 402. The second receiver 410b may obtain information, such as the UAV ID of the mobile device 402, from the BRID. The second receiver 410b may transmit a certificate request, including the UAV ID, to the first BS 105a (the serving base station for the second receiver 410b). In response, the first BS 105a may transmit a certificate retrieval message (including the UAV ID of the mobile device 402) to the USS 420 and/or the UFMS 422 (e.g., via the core network 430) to request the certificate. The USS 420 and/or the UFMS 422 may transmit the certificate associated with the UAV ID of the mobile device 402 in a certificate delivery message to the first BS 105a. The first BS 105a, after receiving the certificate deliver message, may transmit a certificate response including the certificate to the second receiver 410b in response to the certificate request to the second receiver 410b. The second receiver 410b may use the certificate to authenticate the BRID from the mobile device 402.

In a third example, the mobile device 402 may broadcast the BRID. After the mobile device 402 broadcasts the BRID, the second receiver 410b may receive the BRID from the mobile device 402. The second receiver 410b may obtain information, such as the UAV ID of the mobile device 402, from the BRID. The second receiver 410b may transmit a certificate request, including the UAV ID, to the USS 420 and/or the UFMS 422 (e.g., via the first BS 105a and/or the core network 430) by identifying the USS 420 and/or the UFMS 422 using the UAV ID (e.g. the UAV ID may be in the format of a fully qualified domain name (FQDN) and the receiver 410b uses the Domain Name Service (DNS) to retrieve the address of the USS and/or UFMS). The USS 420 and/or the UFMS 422, in response to receiving the certificate request, may transmit a certificate response including the certificate associated with the UAV ID to the second receiver 410b (e.g., via the core network 430 and/or the first BS 105a). The second receiver 410b may use the certificate to authenticate the BRID from the mobile device 402.

In a fourth example, the USS 420 and/or the UFMS 422 may provide the certificate to the core network 430. The core network 430 may determine the geographical location of the mobile device 402 based on the location information (e.g., latitude, longitude, altitude, etc.) in the remote ID, the BRID, and/or the NRID. The core network 430 may determine the one or more coverage areas and corresponding base stations associated with the geographical location, such as the first BS 105a and the first coverage area 130a. The core network 430 may provide the certificate to the first BS 105a after determining that the mobile device 402 is within the first coverage area 130a. Upon receiving the certificate, the first BS 105a may broadcast the certificate in the first coverage area 130a. The second receiver 410b may receive the broadcasted certificate. The mobile device 402 may broadcast the BRID. After the mobile device 402 broadcasts the BRID, the second receiver 410b may receive the BRID from the mobile device 402. The second receiver 410b may use the certificate to authenticate the BRID from the mobile device 402. The first BS 105a and the second BS 105b may broadcast the received certificates using Cellular Broadcasting System with an indication of BRID Certificates, the Commercial Mobile Alert System (CMAS) with an indication of BRID Certificates, or using Multimedia Broadcast/Multicast System using a common or dedicated channel for BRID Certificates to which all receivers subscribe to receive the BRID certificates.

In a fifth example, the first BS 105a may receive the certificate from the mobile device 402, the core network 430, the UFMS 422, and/or the USS 420. The first BS 105a may receive a flight/travel plan of the mobile device 402 from the core network 430, the UFMS 422, and/or the USS 420. Based on the flight plan, the first BS 105a may determine a geographical area that the mobile device 402 will enter. The first BS 105a may identify a coverage area, such as the second coverage area 130b of the second BS 105b, associated with the geographical area that the mobile device 402 will enter. In response, the first BS 105a may identify the second BS 105b being associated with the second coverage area 130b and transmit the certificate to the second BS 105b (for broadcasting to receivers in the second coverage area 130b) before the mobile device 402 enters the second coverage area 130b.

In some aspects of the present disclosure, the receivers 410a-410c may use the certificate to authenticate an arbitrary message transmitted by the mobile device 402. Once authenticated, the receivers 410a-410c is able to verify the authenticity and/or integrity of the arbitrary message of the mobile device 402. In another example, the mobile device 402 may use an arbitrary message as the BRID.

Figure 5:
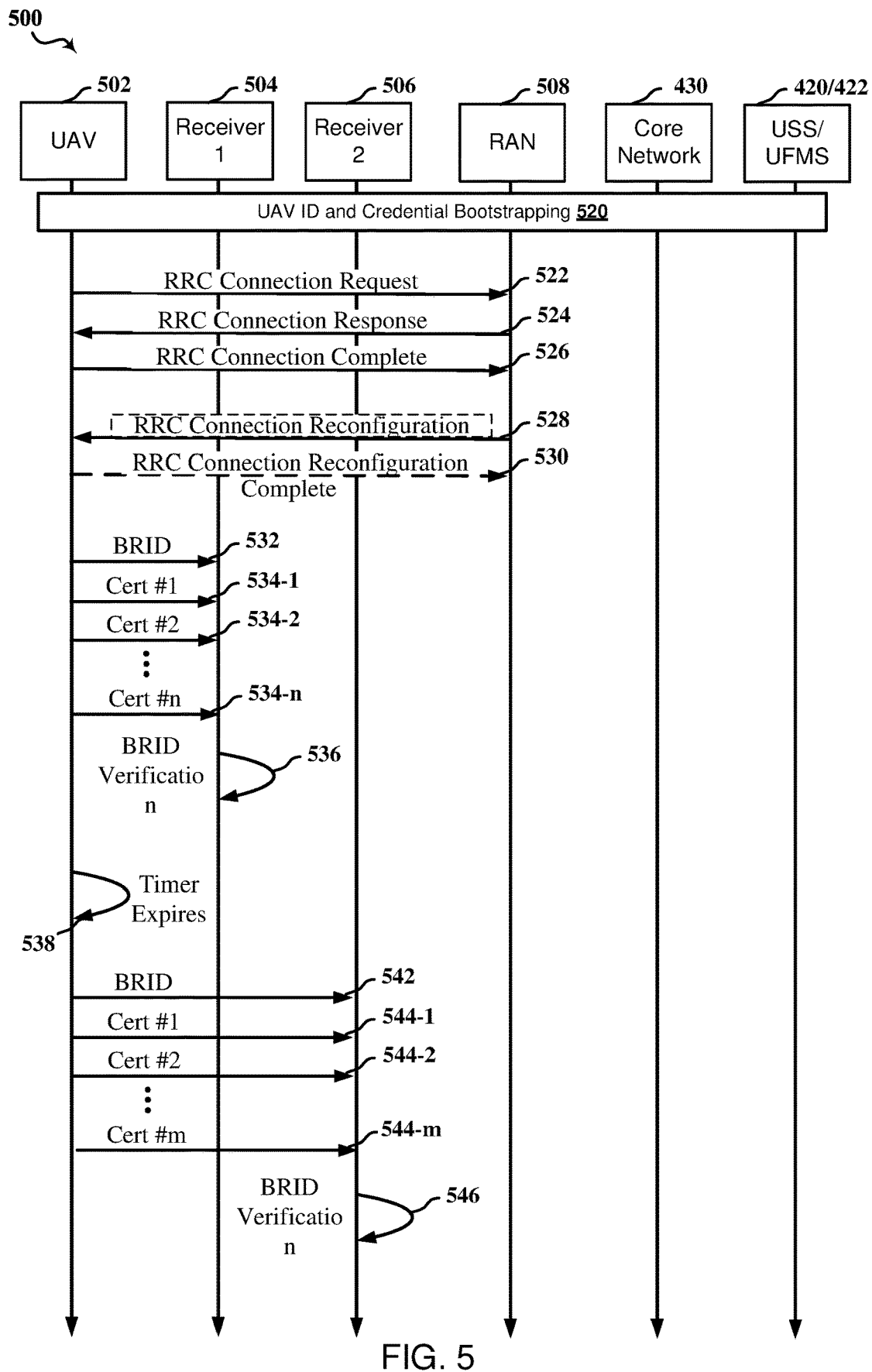
FIG. 5 is a sequence diagram of an example of a process of distributing certificates by a UAV.

Turning to FIG. 5, in some implementations, an example of a sequence diagram 500 may include a UAV 502, a first receiver 504, a second receiver 506, a radio access network (RAN) 508, the core network 430, the UFMS 422, and the USS 420. The first receiver 504 and/or the second receiver 506 may be UAVs, mobile devices, UEs, TPAEs, base stations, controllers, or other devices. In operations 520, the UAV 502 may be configured by obtaining the UAV ID and perform credential bootstrapping (e.g., security certificate). In communication 522, the UAV 502 may transmit a RRC connection request to the RAN 508. In communication 524, the RAN 508 may transmit a RRC connection response to the UAV 502 with parameters for establishing the wireless communication link between the RAN 508 and the UAV

502. In communication 526, the UAV 502 may transmit a RRC connection complete message to the RAN 508. In communication 528, the RAN 508 may optionally transmit a RRC connection reconfiguration message to the UAV 502. The reconfiguration may change connection and/or operation parameters of the UAV 502, such as the periodicity to transmit parts of the certificate, as an example. In communication 530, the UAV 502 may optionally transmit a RRC connection reconfiguration complete message to the RAN 508 in response to completing the reconfiguration.

In some implementations, in communication 532, the UAV 502 may broadcast the BRID, which is received by the first receiver 504. The UAV 502 may partition the certificate into n segments (e.g., 25 segments). The UAV 502 may embed the n segments into n frames. In optional implementations, the UAV 502 may label the n frames to indicate that the n frames carry segments of the certificate. In communication 534-1, the UAV 502 may transmit the first frame carrying the first segment of the certificate. In communication 534-2, the UAV 502 may transmit the second frame carrying the second segment of the certificate, and so forth and so on. In communication 534-n, the UAV 502 may transmit the $n^{th}$ frame carrying the last segment of the certificate. The UAV 502 may transmit each frame of the n frames carrying the segments of the certificate at a predetermined periodicity. For example, the periodicity may be signaled by the USS 420 and/or the UFMS 422 at step 520 during the bootstrapping process. Alternatively, the periodicity signaled by the RAN 508 at step 524 or 528 using a RRC configuration/re-configuration message. The periodicity may also be stored internally (e.g., in the memory, hard-coded, etc.) in the UAV 502 prior to step 520.

In optional implementations, the first frame may include a segment indicator indicating that the certificate includes n segments. The segment indicator may indicate to a receiving device, such as the first receiver 504, that there are n frames (and n segments of the certificate) to be transmitted by the UAV 502.

In another optional implementation, the $n^{th}$ frame may include a termination indicator indicating that the $n^{th}$ frame is carrying the last segment of the certificate by the UAV 502.

In one optional implementation, the UAV 502 may assign sequential numbers to the n frames corresponding to the order of the segments of the certificate. A frame carrying the first segment of the certificate may be assigned "1." A frame carrying the second segment of the certificate may be assigned "2," etc.

In an aspect of the present disclosure, the UAV 502 may partition the certificate into segment groups. The UAV 502 may embed each of the segment groups (equal in number or not equal in number) sequentially into a corresponding frame for transmission. For example, the UAV 520 may partition the certificate into 50 segments. The UAV 520 may group the 50 segments of the certificate into 5 segment groups of 10 (e.g., group 1—segment #1-10, group 2—segment #11-20, and so forth and so on). The UAV 520 may embed the first segment group into a first frame, the second segment group into a second frame, and so forth. The UAV 520 may sequentially transmit the five frames carrying the five segment groups. In some implementations, the groups may have the same number of segments or different number of segments.

In operation 536, the first receiver 504 may validate the BRID by authenticating the BRID using the concatenated certificate (as described above).

In alternative implementations, each segment of the certificate may be associated with an identifier. For example, the UAV 520 may partition the certificate into 30 segments. The UAV 520 may label the first segment with a "1," the second segment with a "2," . . . and the thirtieth segment with a "30." If the first receiver 504 fails to receive some of the segments (e.g., the seventeenth segment, labeled with the identifier "17"), the first receiver 504 may send a request to the UAV 520 to retransmit the seventeenth segment using the identifier.

In operation 538, the UAV 502 may wait until a broadcasting timer expires. The broadcasting timer may indicate an interval the UAV 502 waits between broadcasting two BRIDs. The broadcasting timer may last 1 s, 5 s, 10 s, 50 s, or other suitable intervals (e.g., depending on the operation of the UAV 502, battery power remained in the UAV 502, the operating environment, regulations, etc.)

In some implementations, in communication 542, the UAV 502 may broadcast the BRID, which is received by the second receiver 506. The UAV 502 may partition the certificate into m segments (e.g., 15 segments). The UAV 502 may embed the m segments into m frames. In optional implementations, the UAV 502 may label the m frames to indicate that the m frames carry segments of the certificate. In communication 544-1, the UAV 502 may transmit the first frame carrying the first segment of the certificate. In communication 544-2, the UAV 502 may transmit the second frame carrying the second segment of the certificate, and so forth and so on. In communication 544-m, the UAV 502 may transmit the $m^{th}$ frame carrying the last segment of the certificate. In operation 546, the second receiver 506 may validate the BRID by authenticating the BRID using the concatenated certificate (as described above).

In some instances, the number of segments the UAV 502 divides the certificate into may depend on the communication link technology, the operation of the UAV 502, battery power remained in the UAV 502, the operating environment, regulations, etc.

Turning to FIGS. 6A-E, in an implementation, an example of a sequence diagram 600 may include a UAV 602, a first receiver 604, a second receiver 606, the first BS 105a, the second BS 105b, the core network 430, the UFMS 422, and the USS 420. The first receiver 604 and/or the second receiver 606 may be UAVs, mobile devices, UEs, TPAEs, base stations, controllers, or other devices. In communication 620, the UAV 602 may be configured by obtaining the UAV ID and perform credential bootstrapping (e.g., security certificate). In communication 622, the UAV 602 may be registered and/or connected to the mobile network including the first BS 105a and the second BS 105b. In communication 624, the UAV 602 may register with the USS 420 and/or the UFMS 422.

Figure 6A:
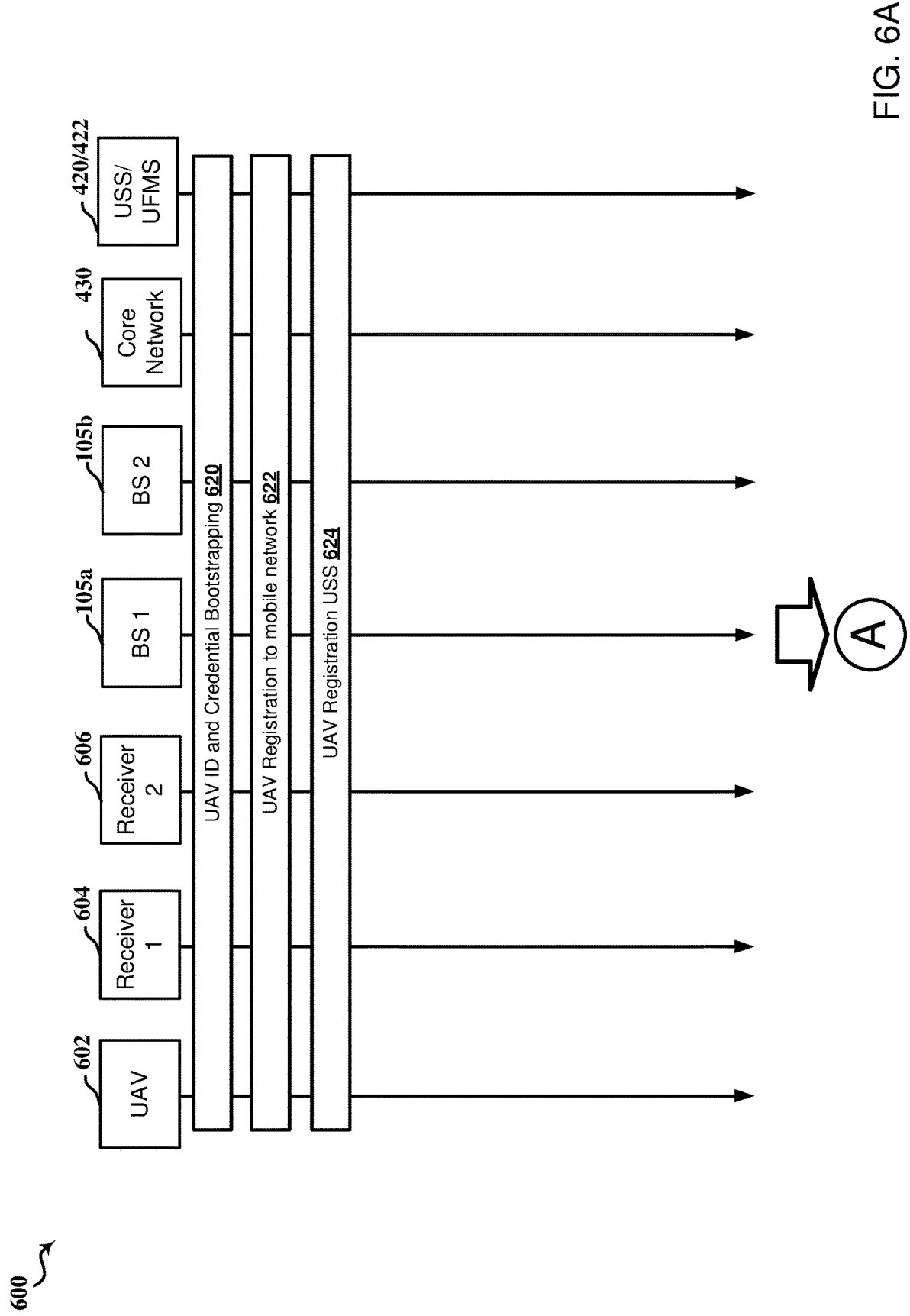
FIG. 6A is a sequence diagram of an example of a UAV initialization process into a network.
Figure 6B:
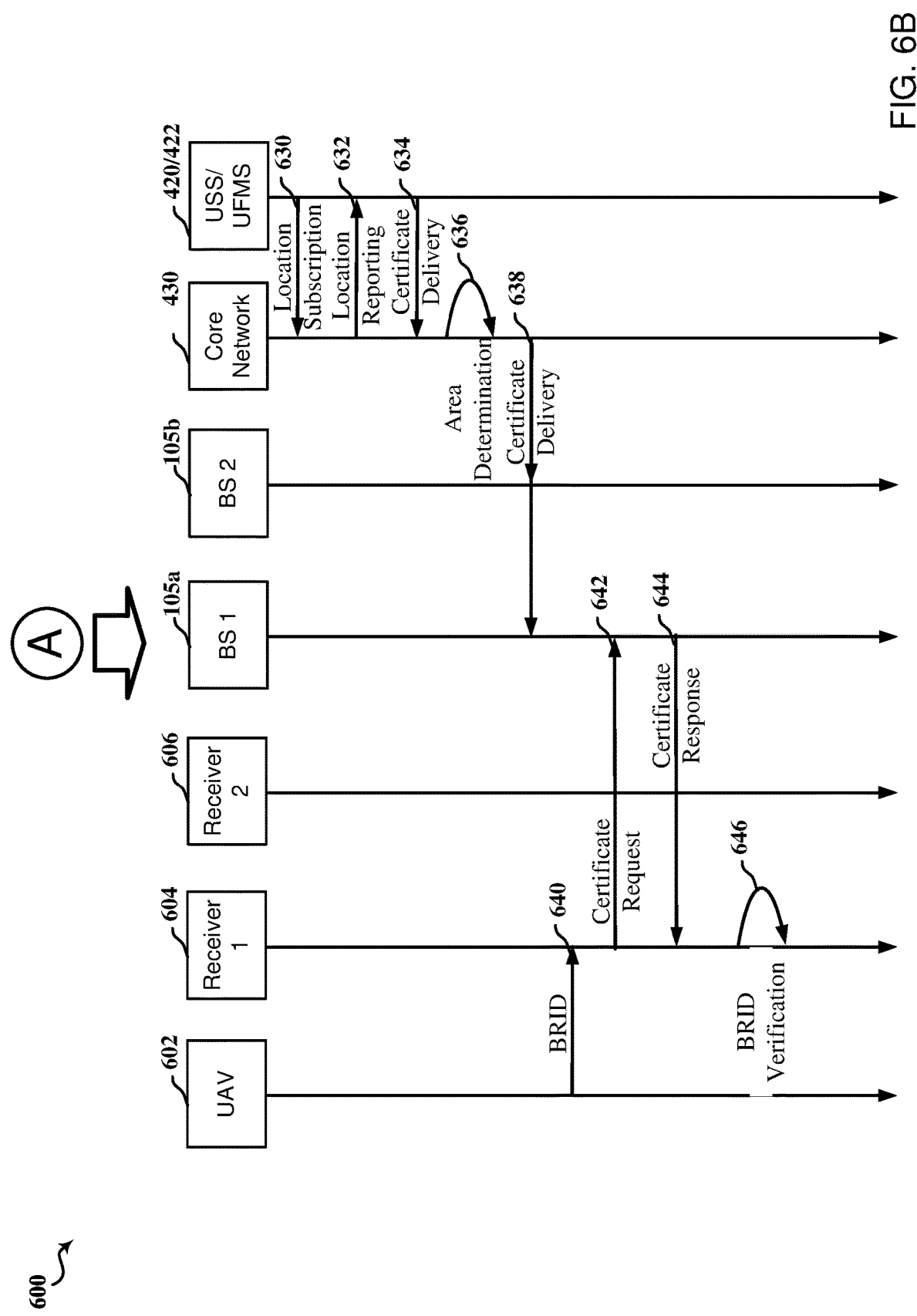
FIG. 6B is a sequence diagram of a first example of a process of distributing certificates by a base station.

Referring to FIGS. 6A and 6B, in certain implementations, in communication 630, the USS 420 may transmit a location subscription to the core network 430 to obtain the updated location of the UAV 602. In communication 632, the core network 430 may transmit a location report including the last-known location of the UAV 602 (based on the remote ID, NRID, or BRID received). In optional implementations, the USS 420 may subscribe to the UFMS 422 to obtain location information from the UFMS 422. In another instance, the USS 420 may obtain location information from the Location Service (LCS) of the communication network 100. In communication 634, the USS 420 and/or the UFMS 422 may transmit the certificate associated with the UAV 602 (including the UAV ID) to the core network 430. In operation 636, based on the location information received from the USS 420, the UFMS 422, the core network 430 may determine the geographical location of the UAV 602 based on the location information (e.g., latitude, longitude, altitude, etc.) in the location report. The core network 430 may determine the one or more coverage areas and corresponding base stations associated with the geographical location, such as the first BS 105a and the first coverage area 130a. In communication 638, the core network 430 may provide the certificate to the first BS 105a and/or the second BS 105b after determining that the UAV 602 is within the first coverage area 130a.

In some implementations, in communication 640, the UAV 602 may broadcast the BRID. After the UAV 602 broadcasts the BRID, the first receiver 604 may receive the BRID from the UAV 602. The first receiver 604 may obtain information, such as the UAV ID of the UAV 602, from the BRID. In communication 642, the first receiver 604 may transmit a certificate request, including the UAV ID, to the first BS 105a (the serving base station for the first receiver 604). In response, the first BS 105a may identify the certificate associated with the UAV ID. In communication 644, the first BS 105a may transmit a certificate response including the certificate (received earlier from the core network 430 at 638) to the first receiver 604. In operation 646, the first receiver 604 may use the certificate to authenticate the BRID from the UAV 602.

Figure 6C:
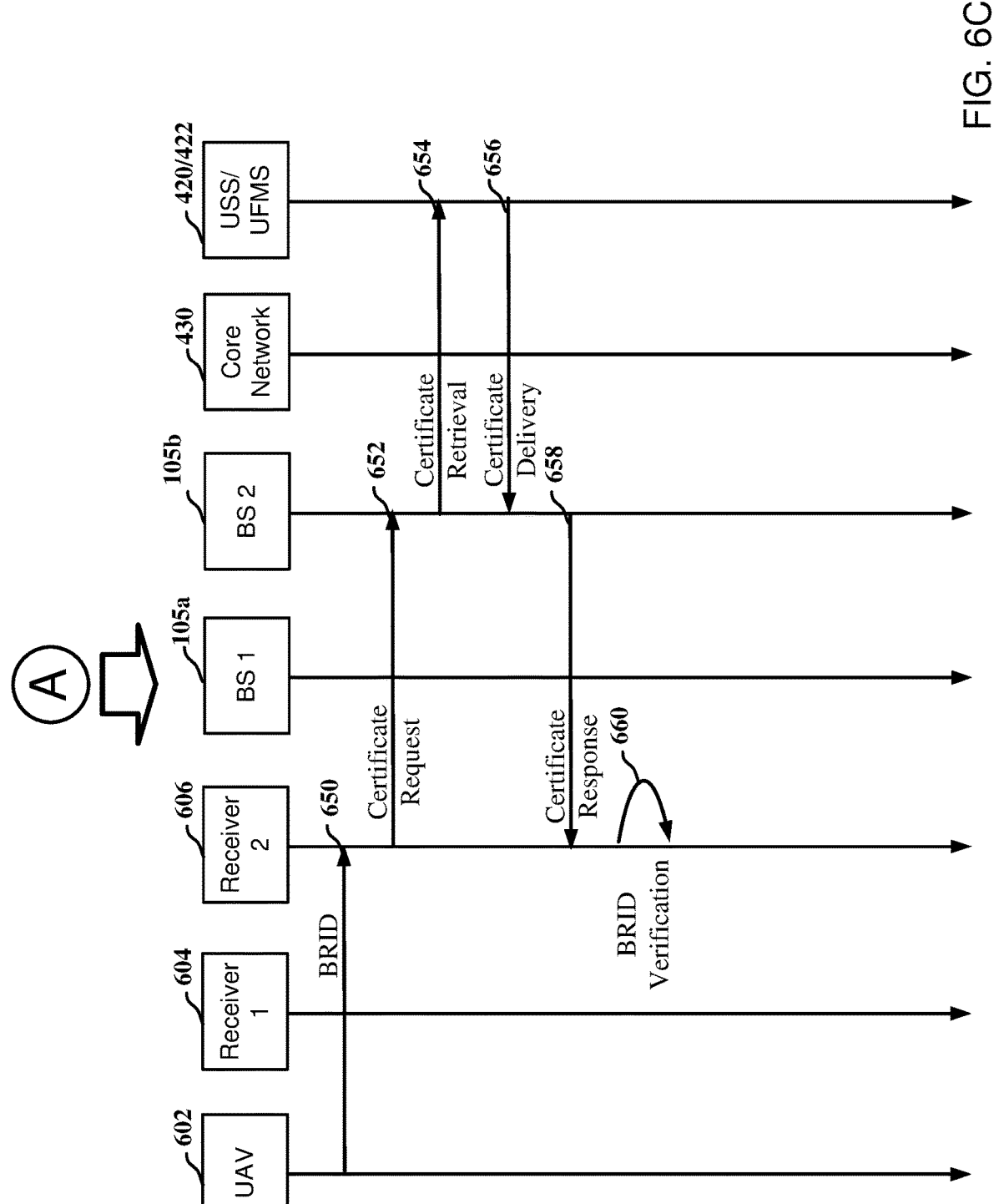
FIG. 6C is a sequence diagram of a second example of a process of distributing certificates by a base station.

Turning to FIGS. 6A and 6C, in some implementations, in communication 650, the UAV 602 may broadcast the BRID. After the UAV 602 broadcasts the BRID, the second receiver 606 may receive the BRID from the UAV 602. The second receiver 606 may obtain information, such as the UAV ID of the UAV 602, from the BRID. In communication 652, the second receiver 606 may transmit a certificate request, including the UAV ID, to the second BS 105b (e.g., the serving base station for the second receiver 606). In response, in communication 654, the second BS 105b may transmit a certificate retrieval message (including the UAV ID of the UAV 602) to the UFMS 422 (e.g., via the core network 430) to request the certificate. Alternatively, the BS 105b may transmit the certificate retrieval message to the USS 420 through the UFMS to request the certificate. In communication 656, the USS 420 and/or the UFMS 422 may transmit the certificate associated with the UAV ID of the UAV 602 in a certificate delivery message to the second BS 105b. In communication 658, the second BS 105b, after receiving the certificate deliver message, may transmit a certificate response including the certificate to the second receiver 606 in response to the certificate request to the second receiver 606. In operation 660, the second receiver 606 may use the certificate to authenticate the BRID from the UAV 602.

Figure 6D:
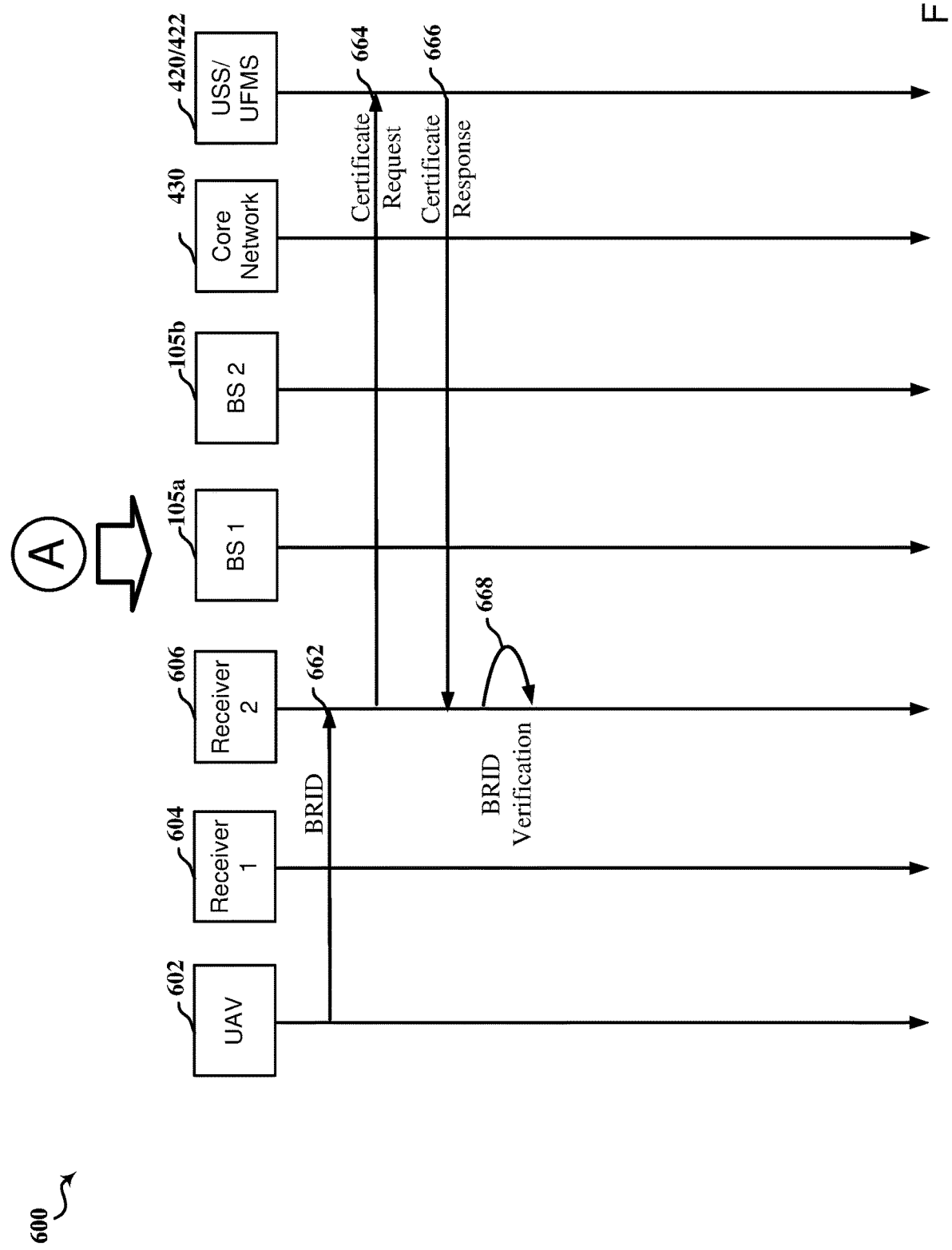
FIG. 6D is a sequence diagram of an example of a process of obtaining certificates by a receiver.

Turning to FIGS. 6A and 6D, in certain implementations, in communication 662, the UAV 602 may broadcast the BRID. After the UAV 602 broadcasts the BRID, the second receiver 606 may receive the BRID from the UAV 602. The second receiver 606 may obtain information, such as the UAV ID of the UAV 602, from the BRID. In communication 664, the second receiver 606 may transmit a certificate request, including the UAV ID, to the USS 420 and/or UFMS 422 (e.g., via the first BS 105a, the second BS 105b, and/or the core network 430). In communication 666, the USS 420 and/or the UFMS 422, in response to receiving the certificate request, may transmit a certificate response including the certificate associated with the UAV ID to the second receiver 606 (e.g., via the core network 430, the first BS 105a, and/or the second BS 105b). In operation 668, the second receiver 606 may use the certificate to authenticate the BRID from the UAV 602.

Figure 6E:
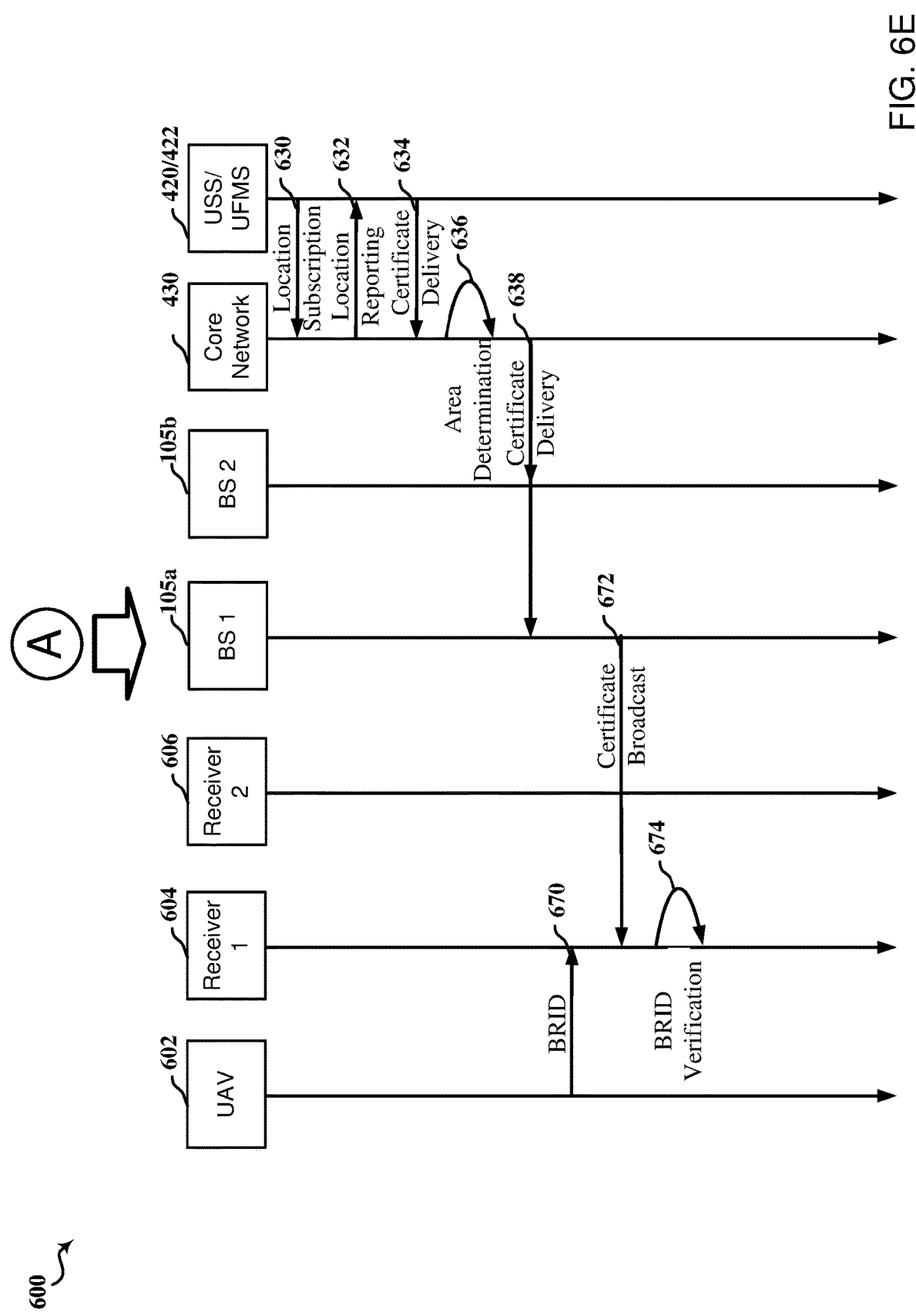
FIG. 6E is a sequence diagram of an example of a process of broadcasting certificates by a base station.

Referring to FIGS. 6A and 6E, in an implementation, at 630, the core network 430 may transmit a location subscription to the USS 420 and/or the UFMS 422 to obtain the updated location of the UAV 602. In communication 632, the USS 420 and/or the UFMS 422 may transmit a location report including the last-known location of the UAV 602 (based on the remote ID, NRID, or BRID received). In communication 634, the USS 420 and/or the UFMS 422 may transmit the certificate associated with the UAV 602 (including the UAV ID) to the core network 430. In operation 636, the core network 430 may determine the geographical location of the UAV 602 based on the location information (e.g., latitude, longitude, altitude, etc.) in the remote ID, the BRID, and/or the NRID. The core network 430 may determine the one or more coverage areas and corresponding base stations associated with the geographical location, such as the first BS 105a and the first coverage area 130a. In communication 638, the core network 430 may provide the certificate to the first BS 105a via a certificate delivery message after determining that the UAV 602 is within the first coverage area 130a. In communication 670, the UAV 602 may broadcast the BRID. After the UAV 602 broadcasts the BRID, the first receiver 604 may receive the BRID from the UAV 602. In communication 672, the first BS 105a may broadcast the certificate in the first coverage area 130a (received from the core network 430 at 638). The first receiver 604 may receive the broadcasted certificate. In operation 674, the first receiver 604 may use the certificate to authenticate the BRID from the UAV 602.

Figure 7A:
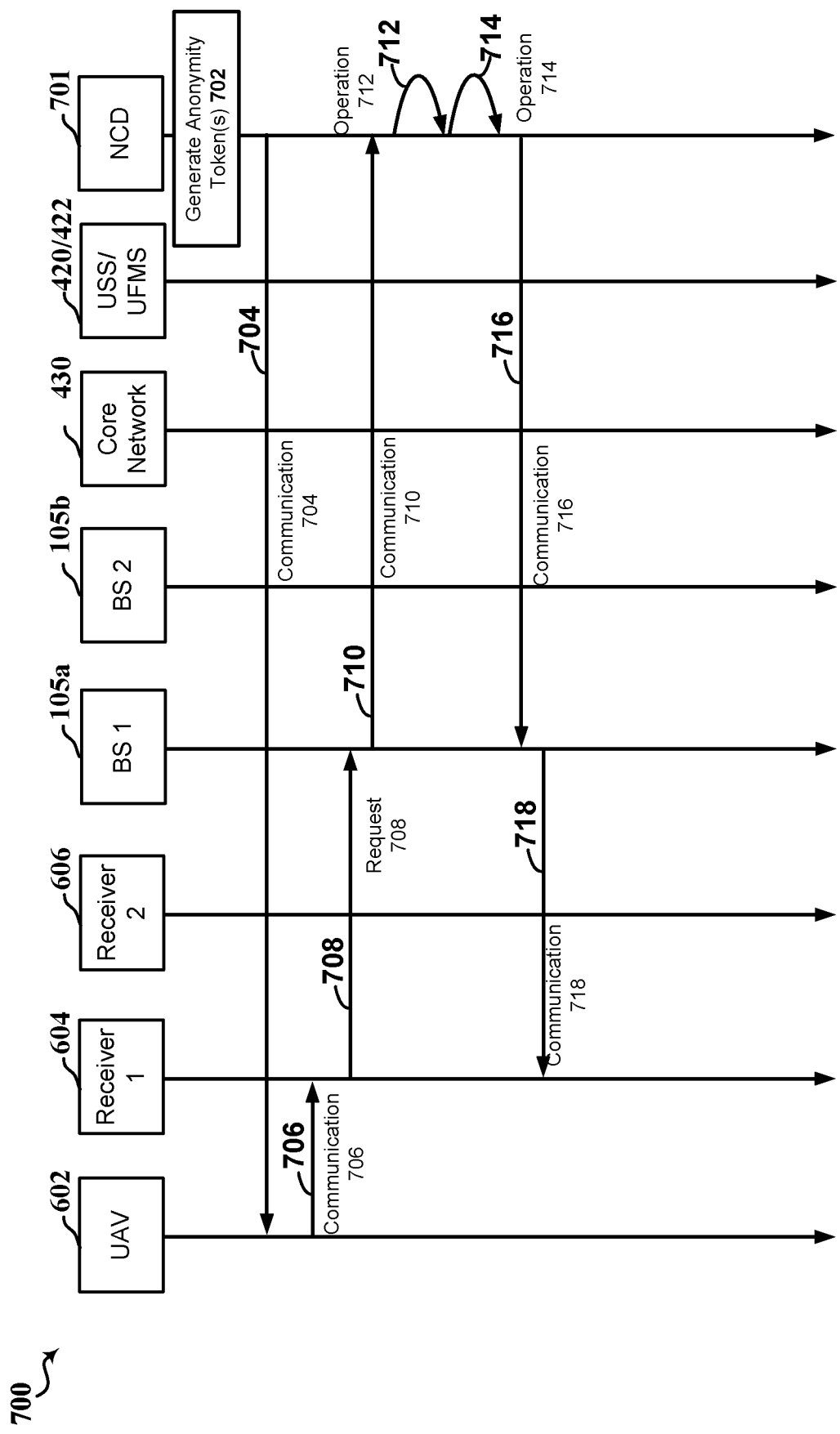
FIG. 7A is a sequence diagram of an example of a process of managing an UAV identity.

FIG. 7A is a sequence diagram of an example of a process 700 of managing a UAV identity according to some embodiments. With reference to FIGS. 1-7A, the process 700 may include the UAV 602, the first receiver 604, the second receiver 606, the first BS 105a, the second BS 105b, the core network 430, the UFMS 422, the USS 420, and a network computing device (NCD) 701. In some implementations, the NCD 701 may be implemented in the core network 430.

In operation 702, the NCD 701 may generate an anonymity token that is associated with a digital certificate of a UAV. In communication 704, the NCD 701 may provide the anonymity token to the UAV for use in operations. In some embodiments, the NCD 701 may generate a plurality of anonymity tokens that are associated with the digital certificate, in which each of the plurality of anonymity tokens is configured with a usability time limitation.

In communication 706, the UAV 602 may transmit a UAV message that is received by the first receiver 604. The UAV message may include the anonymity token and a digital signature associated with the UAV message. The first receiver 604 may send a request to authenticate the UAV that includes the anonymity token. In some embodiments, the first receiver 604 may send a request 708 to the first BS 105a, and the first BS may send a request in communication 710 to the NCD 701.

In operation 712, the NCD 701 may identify a digital certificate associated with the UAV 602 using the anonymity token included in the request. In some embodiments, the anonymity token may include a pointer or other information that may enable the NCD 701 to identify the digital certificate associated with the UAV602.

In operation 714, the NCD 701 may determine whether the digital signature is verified using the digital certificate. In some embodiments, the NCD 701 that may cryptographically verify the digital signature using the digital certificate.

Based on the determination, the NCD 701 may send a response in communication 716 to the first BS 105*a*, and the first BS 105*a* may send a response in communication 718 to the first receiver 604. In some embodiments, in response to determining that the digital signature is verified using the digital certificate, the response in communication 716 and the response in communication 718 may indicate that the UAV message is authenticated.

Figure 7B:
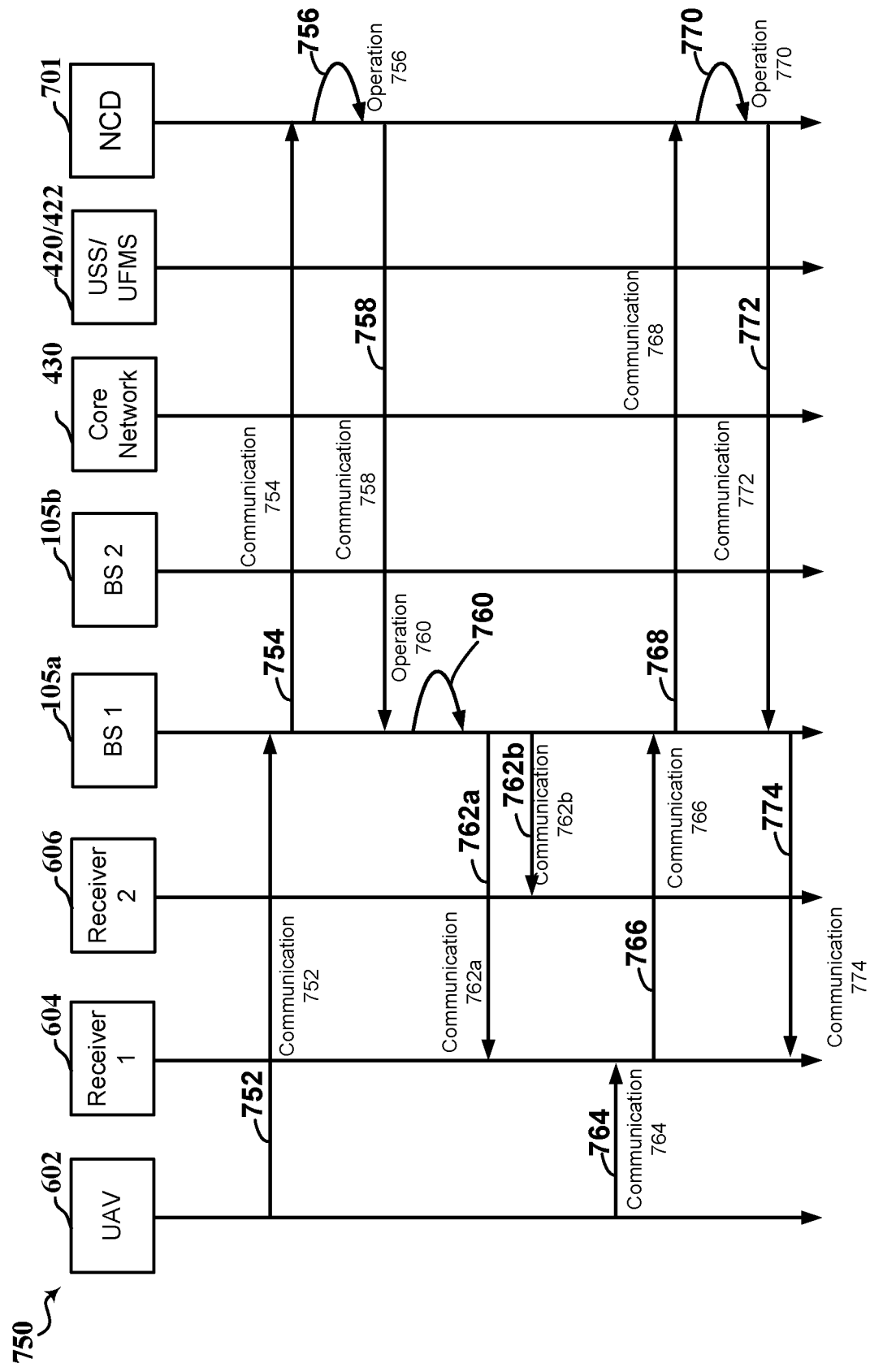
FIG. 7B is a sequence diagram of an example of a process of managing an UAV identity.

FIG. 7B is a sequence diagram of an example of a process 750 of managing an UAV identity according to some embodiments. With reference to FIGS. 1-7B, the process 750 may include the UAV 602, the first receiver 604, the second receiver 606, the first BS 105*a*, the second BS 105*b*, the core network 430, the UFMS 422, the USS 420, and the NCD 701.

In communication 752, the first BS 105*a* may receive from the UAV 602 an assertion that the UAV is entitled to perform operations anonymously. In some embodiments, the assertion may include an anonymity token of the UAV. In some embodiments, the assertion may include a digital certificate of the UAV. The first BS 105*a* may send to the NCD 701 a request in communication 754 to authenticate the UAV, in which the request includes the assertion of the UAV.

In operation 756, the NCD 701 may determine based on the assertion whether the UAV 602 is entitled to perform operations anonymously. In some embodiments, the NCD 701 may determine whether the UAV 602 is associated with an entitlement to operate anonymously. In some embodiments, information indicating such entitlement may be stored in a data structure and/or in a memory device accessible by the NCD 701.

The first BS 105*a* may receive a response in communication 758 from the NCD 701 indicating whether the UAV is entitled to perform operations anonymously. In some embodiments, the first BS 105*a* may determine based on the response 758 whether the UAV is entitled to perform operations anonymously.

In operation 760, in response to determining that the UAV is authenticated, the first BS 105*a* may broadcast information about the UAV that is configured without identity information of the UAV in response to determining that the UAV is entitled to perform operations anonymously. The first BS 105*a* may send the broadcast in communications 762*a*, 762*b*, which may be received by the first receiver 604 and/or the second receiver 606.

In communication 764, the UAV 602 may broadcast a UAV message in communication 764 that includes the assertion and a digital signature associated with the UAV, which is received by the first receiver 604. The first receiver 604 may send a request in communication 766 to authenticate the UAV 602 to the first BS 105*a*. The request in communication 766 may include the assertion and of the digital signature associated with the UAV message from the UAV 602.

The first BS 105*a* may send to the NCD 701 a request in communication 768 to authenticate the UAV message. The request in communication 768 may include the assertion and the digital signature of the UAV 602. In operation 770, the NCD 701 may determine whether the UAV 602 is entitled to operate anonymously (e.g., as described above with regard to operations 712 and 714 of the process 700 (FIG. 7A).

The first BS 105*a* may receive a response in communication 772 from the NCD 701 indicating whether the UAV message is authenticated. In some embodiments, the first B S 105*a* may determine based on the response in communication 772 whether the UAV message is authenticated.

In response to determining that the UAV message is authenticated, the first BS 105*a* may send an indication in communication 774 to the requesting device (e.g., the first receiver 604) that the UAV message is authenticated.

Figure 8:
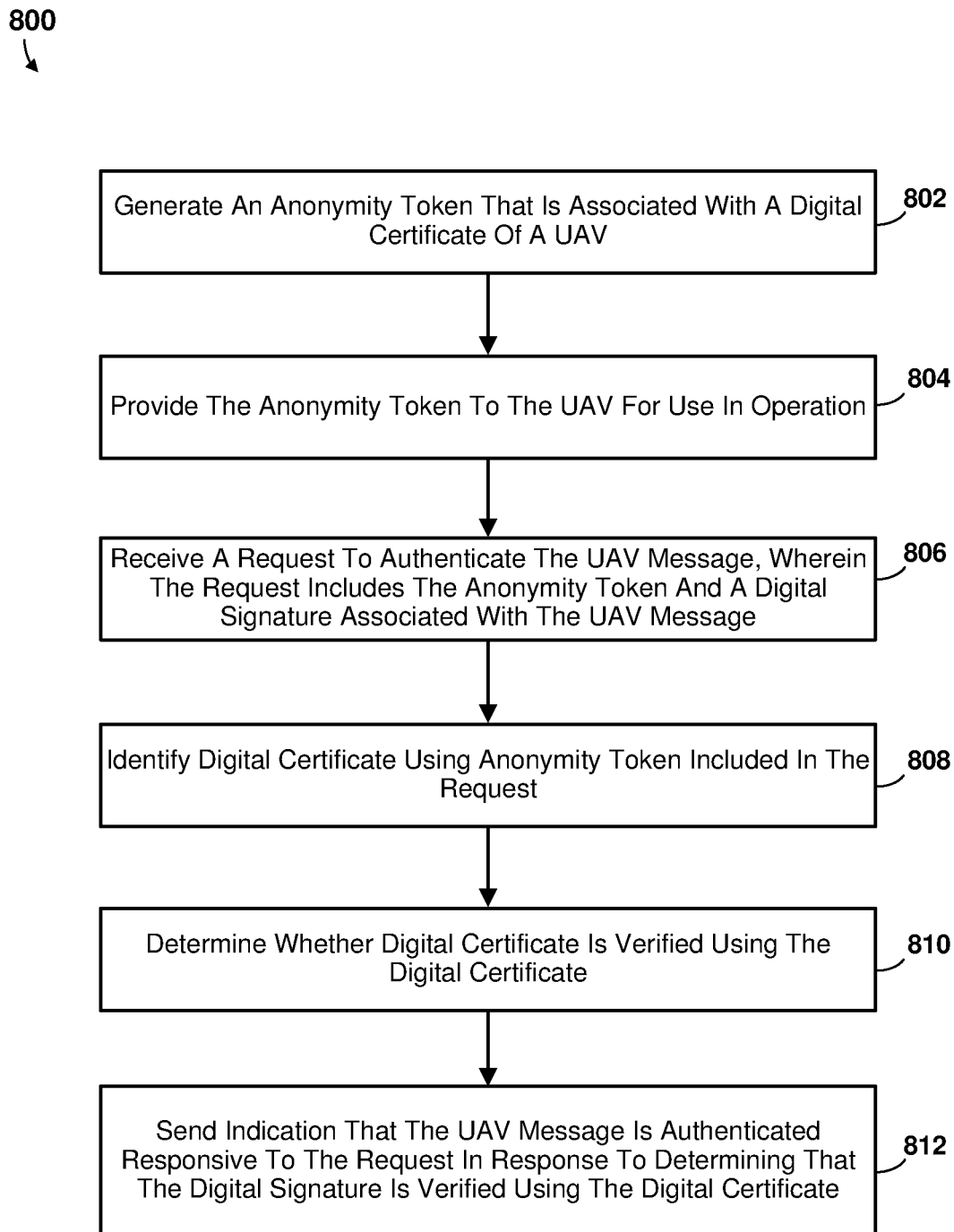
FIG. 8 is a process flow diagram illustrating a method that may be performed by a processor of a network computing device for managing a UAV identity according to various embodiments.

FIG. 8 is a process flow diagram illustrating a method 800 that may be performed by a processor of a network computing device for managing a UAV identity according to some embodiments. With reference to FIGS. 1-8, the operations of the method 800 may be performed by a processor of a network computing device.

Figure 13:
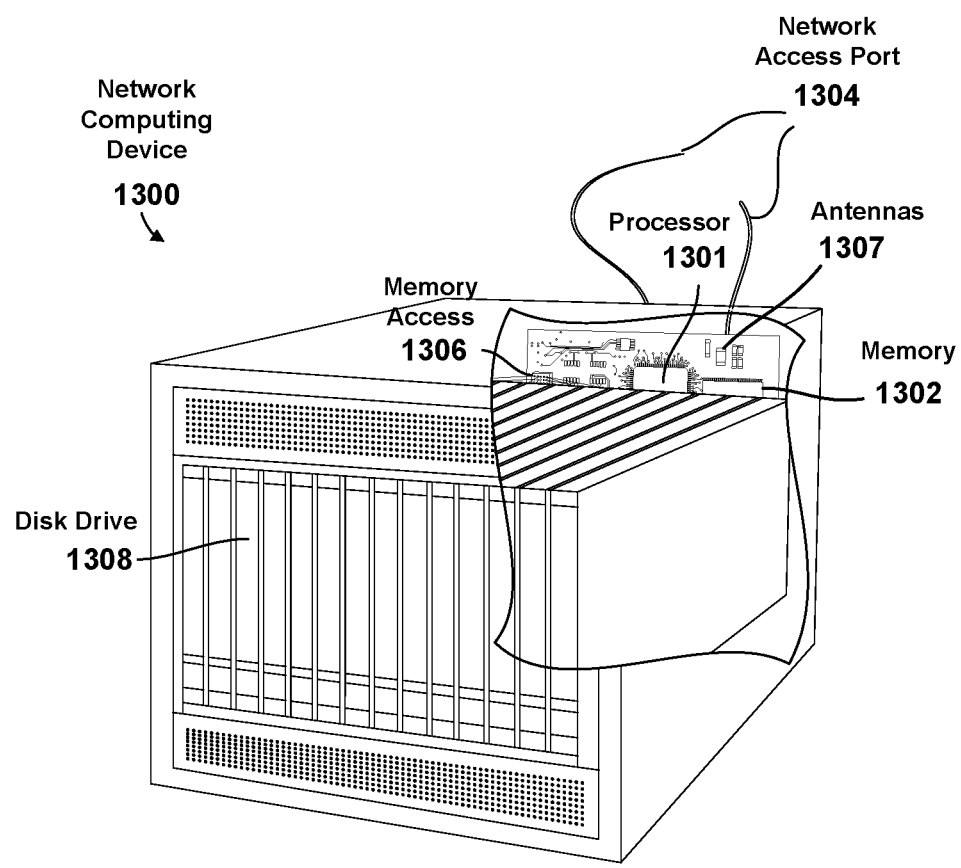
FIG. 13 is a component block diagram of a network computing device suitable for use with various embodiments.

In block 802, the processor may generate an anonymity token that is associated with a digital certificate of a UAV. In some embodiments, the anonymity token may include a cryptographically verifiable indication that the anonymity token is associated with the UAV's digital certificate. In some embodiments, the anonymity token may include or point to an indication that the UAV (and/or the UAV operator) is entitled to perform operations anonymously. In some embodiments, each anonymity token may include (or may be) a hash of the digital certificate. In some embodiments, each anonymity token may include a hash of the digital certificate that is concatenated with a secret value, which may be stored by or accessible to the network computing device. Means for performing the operations of block 802 may include the processor 1301 (FIG. 13).

In some embodiments, the anonymity token may be configured with a usability time limitation. For example, the anonymity token may be configured with a time-to-live or another temporal restriction on its usability that limits the usefulness of the anonymity token to a specified time range or duration, outside of which the UAV would be unable to use the anonymity token to perform operations anonymously. In other words, if a UAV made transmissions using on an anonymity token before or after the temporal restrictions of that token, the UAV would not be authenticated by the base station or a the NCD 701.

In some embodiments, the anonymity token may be configured with a usability geographic limitation. For example, the anonymity token may be configured with a geofence, coordinates, or another geographic restriction on its usability that limits the usefulness of the anonymity token to a specified location, area, or physical region, such as may correspond to a legal jurisdiction, a theater of operation, a specified delivery route or travel path, or the like, outside of which the UAV would be unable to use the anonymity token to perform operations anonymously.

In block 804, the processor may provide the anonymity token to the UAV for use in operations. In some embodiments, providing the anonymity token to the UAV may enable the UAV to use the anonymity token to perform operations anonymously. For example, the UAV may associate the anonymity token with a transmission. In some embodiments, the UAV may digitally sign a transmission using a private key associated the anonymity token. In some embodiments, the anonymity token may be a cryptographic hash of the public key certificate with which it is associated. In some embodiments, the associated public key certificate may contain a pseudonyms to disguise the identity of the UAV or its operator. Means for performing the operations of block 802 may include the processor 1301, the network access port(s) 1304, and the antenna(s) 1307 (FIG. 13).

In block 806, the processor may receive a request to authenticate the UAV message. The request may include the anonymity token and a digital signature associated with the UAV message. For example, the network computing device may receive the request from UTM infrastructure, such as a base station or other network access point, from another UAV, from a receiving device such as a ground station, smartphone, or other wireless device. Means for performing the operations of block 806 may include the processor 1301, the network access port(s) 1304, and the antenna(s) 1307 (FIG. 13).

In block 808, the processor may identify the digital certificate using the anonymity token included in the request. For example, an association between a digital certificate and one or more anonymity tokens may be stored in a memory or memory device accessible by the network computing device. Means for performing the operations of block 802 may include the processor 1301 (FIG. 13).

In block 810, the processor may determine whether the digital signature is verified using the digital certificate. In some embodiments, the processor may use the digital certificate to cryptographically verify the digital signature. In some embodiments, the processor may use a public key associated with the digital certificate to authenticate the digital signature (and/or to authenticate the digitally signed UAV message). Means for performing the operations of block 810 may include the processor 1301 (FIG. 13).

In block 812, the processor may send an indication that the UAV message is authenticated responsive to (i.e., in response to) the request in response to determining that the digital signature is verified using the digital certificate. For example, the processor may send the indication to the requesting device. Means for performing the operations of block 812 may include the processor 1301, the network access port(s) 1304, and the antenna(s) 1307 (FIG. 13).

Figure 9:
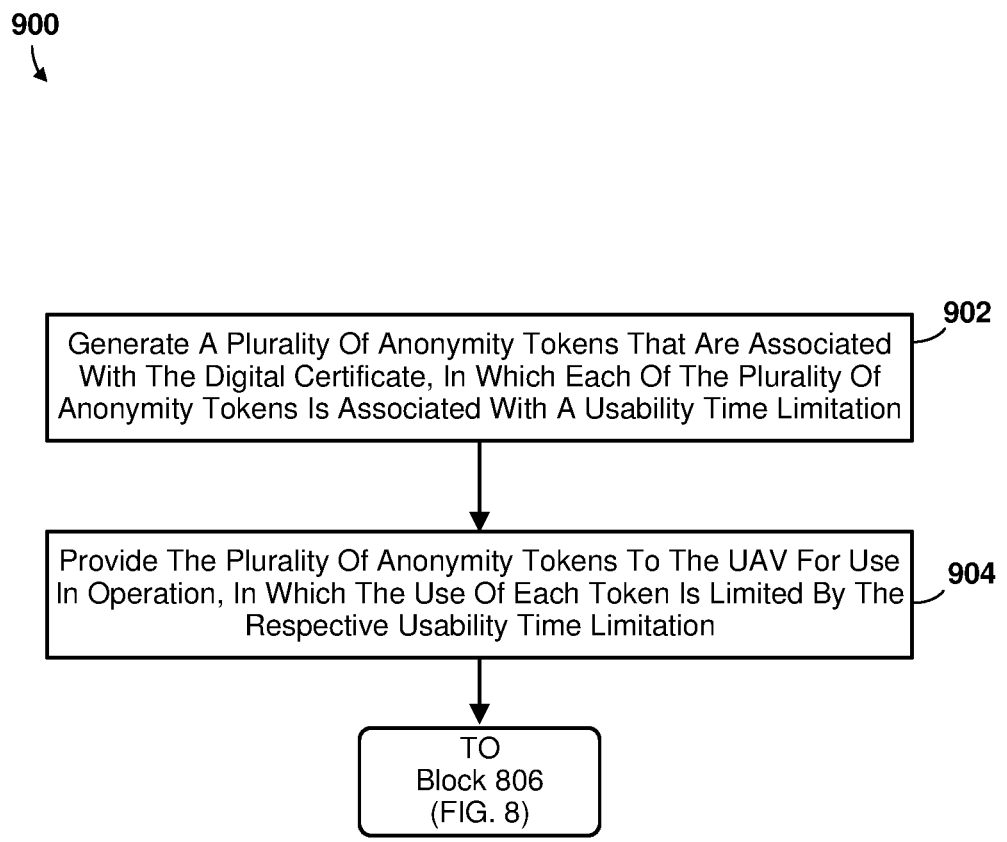
FIG. 9 is a process flow diagram illustrating operations that may be performed by a processor of a network computing device as part of the method for managing a UAV identity according to various embodiments.

FIG. 9 is a process flow diagram illustrating operations 900 that may be performed by a processor of a network computing device as part of the method 800 for managing a UAV identity according to various embodiments. With reference to FIGS. 1-9, the operations 900 may be performed by a processor of a network computing device. As noted above, the UAV may be configured with a plurality of limited use anonymity tokens to enhance the anonymity or to further reduce the trackability of the UAV.

In block 902, the processor may generate a plurality of anonymity tokens that are associated with the digital certificate, in which each of the plurality of anonymity tokens is configured with a usability time limitation. For example, each of the plurality of anonymity tokens may be usable for a specified time period or duration, including one-time-only use. In some embodiments, generating the plurality of anonymity tokens that are associated with the digital certificate may include generating a plurality of anonymity tokens using a keyed hash tree. Means for performing the operations of block 902 may include the processor 1301 (FIG. 13).

In block 904, the processor may provide the anonymity token to the UAV for use in operations including providing the plurality of anonymity tokens to the UAV for use in operations, in which the use of each anonymity token is limited by the respective usability time limitation. Means for performing the operations of block 904 may include the processor 1301, the network access port(s) 1304, and the antenna(s) 1307 (FIG. 13).

The processor may perform the operations of block 806 of the method 800 (FIG. 8) as described.

Figure 10:
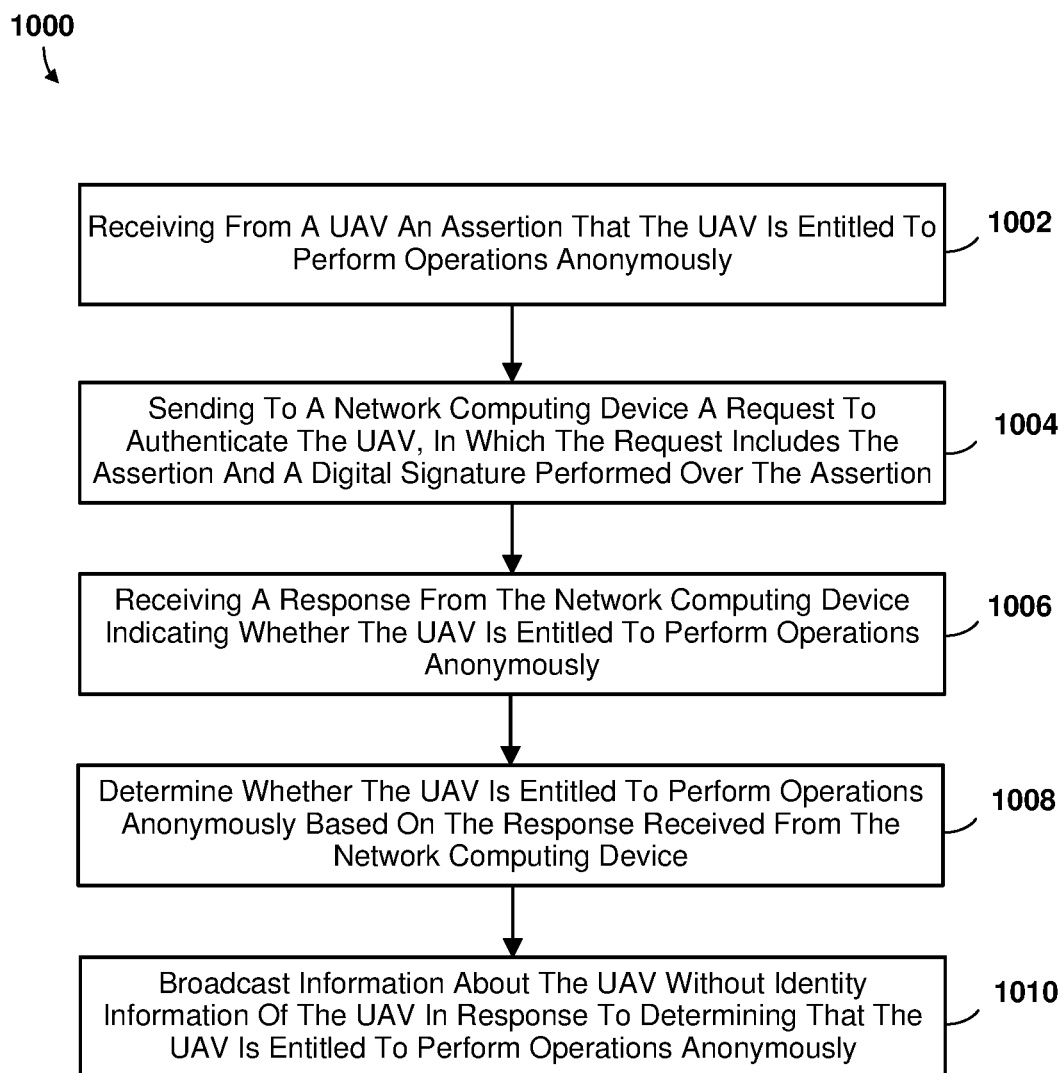
FIG. 10 is a process flow diagram illustrating a method that may be performed by a processor of a base station for managing a UAV identity according to various embodiments.

FIG. 10 is a process flow diagram illustrating a method 1000 for managing a UAV identity according to various embodiments. With reference to FIGS. 1-10, the method 1000 may be performed by a processor of a base station.

In block 1002, the processor may receive from a UAV an assertion that the UAV is entitled to perform operations anonymously. In some embodiments, the assertion may include a digital certificate of the UAV. In some embodiments, the assertion may include an anonymity token. In some embodiments, the anonymity token may include or be associated with a data structure such as a digital certificate attribute, pointer or location identifier that may enable the identification or location (e.g., by a network computing device) of information indicating that the UAV is entitled to perform operations anonymously. In some embodiments, the digital certificate may include information indicating the entitlement of the UAV to perform operations anonymously. In some embodiments, the anonymity token may include a cryptographically verifiable indication that the anonymity token is associated with a digital certificate of the UAV, such as a hash, or portion of a hash, of the digital certificate. Means for performing the operations of block 1002 may include the processor 312, the modem 320, the transceiver 302, and the RF front end 388 (FIG. 3).

In block 1004, the processor may send to a network computing device a request to authenticate the UAV. In such embodiments, the request may include the assertion and a digital signature associated with the UAV. Means for performing the operations of block 1004 may include the processor 312, the modem 320, the transceiver 302, and the RF front end 388 (FIG. 3).

In block 1006, the processor may receive a response from the network computing device indicating whether the UAV is entitled to perform operations anonymously. Means for performing the operations of block 1006 may include the processor 312, the modem 320, the transceiver 302, and the RF front end 388 (FIG. 3).

In block 1008, the processor may determine whether the UAV is entitled to perform operations anonymously based on the response received from the network computing device. Means for performing the operations of block 1008 may include the processor 312 (FIG. 3).

In block 1010, the processor may broadcast of information about the UAV without identity information of the UAV in response to determining that the UAV is entitled to perform operations anonymously. Means for performing the operations of block 1010 may include the processor 312, the modem 320, the transceiver 302, and the RF front end 388 (FIG. 3).

Figure 11:
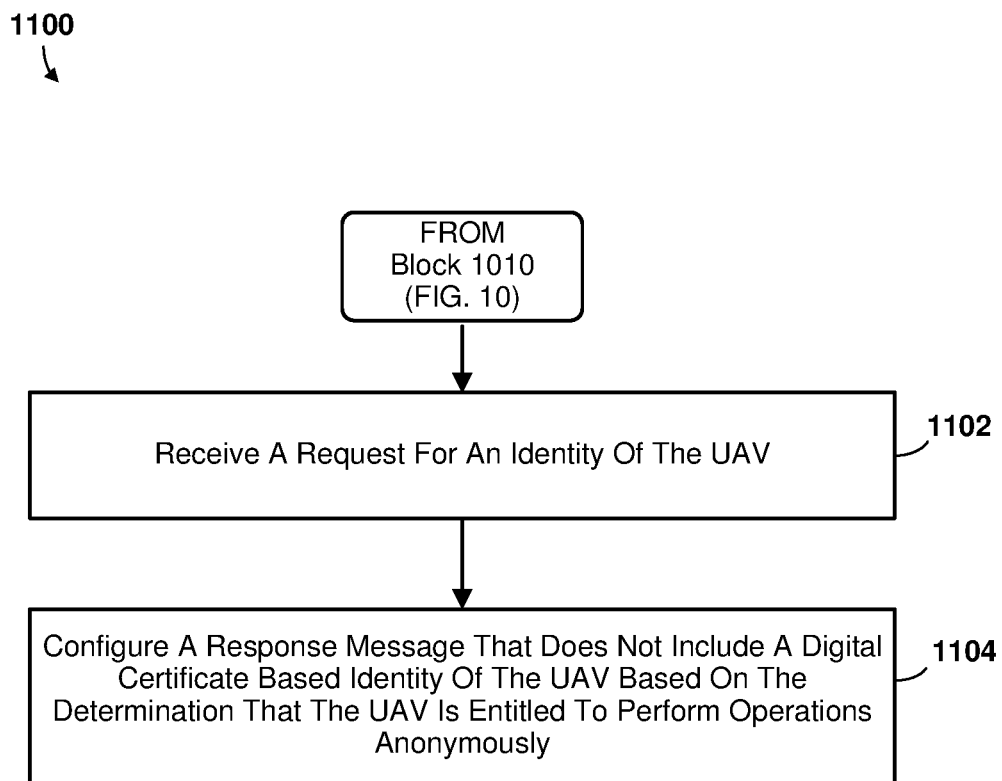
FIG. 11 is a process flow diagram illustrating operations that may be performed by a processor of a base station as part of the method for managing a UAV identity according to various embodiments.

FIG. 11 is a process flow diagram illustrating operations 1100 that may be performed by a processor of a base station as part of the method 1000 for managing a UAV identity according to various embodiments. With reference to FIGS. 1-11, the operations 1100 may be performed by a processor of a base station.

Following the performance of the operations of block 1010 of the method 1000 (FIG. 10) as described, the processor may receive a request for an identity of the UAV in block 1102. Means for performing the operations of block 1102 may include the processor 312, the modem 320, the transceiver 302, and the RF front end 388 (FIG. 3).

In block 1104, the processor may configure a response message that does not indicate the identity of the UAV based on determining that the UAV is entitled to perform operations anonymously. In some embodiments, the processor may configure a response message that does not include information indicating the identity of the UAV. In some embodiments, the processor may configure a response message that includes a pseudonym or another identifier of the UAV that does not indicate the UAV identity. In some embodiments, the pseudonym may also be an anonymity token. Means for performing the operations of block 1104 may include the processor 312 (FIG. 3).

Figure 12:
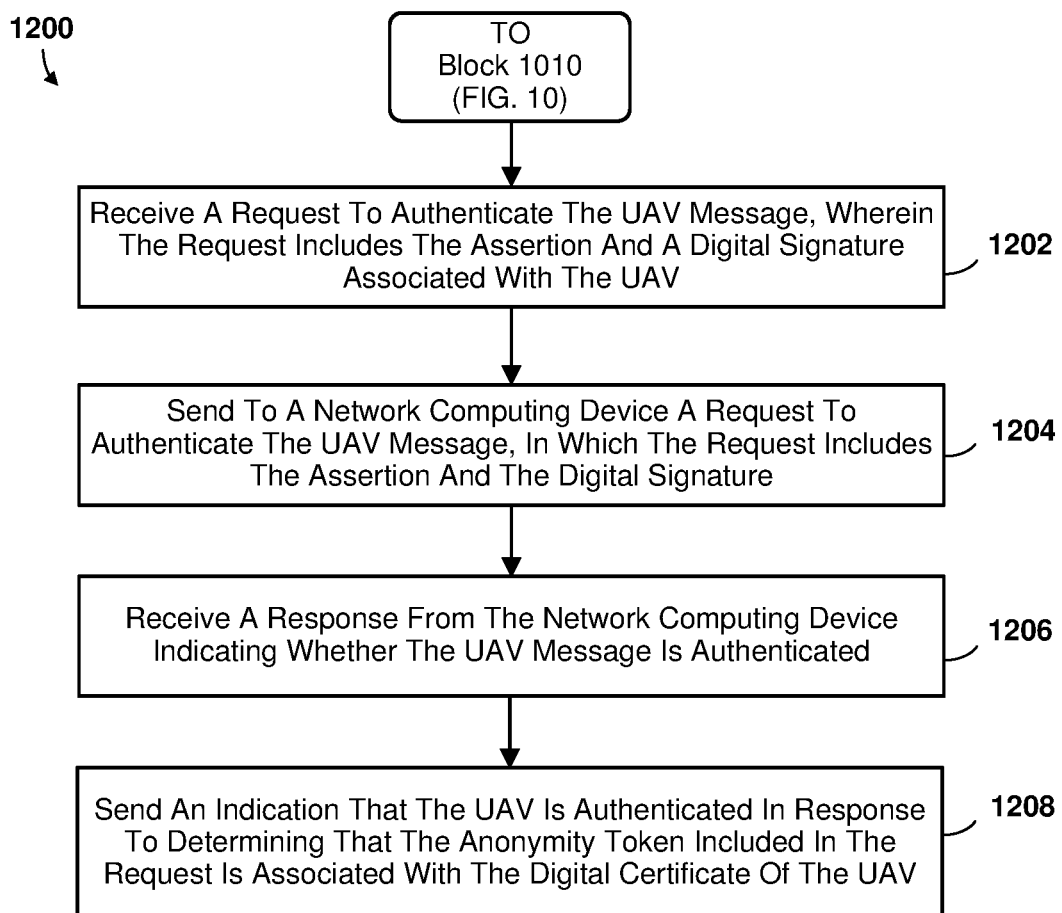
FIG. 12 is a process flow diagram illustrating operations that may be performed by a processor of a base station as part of the method for managing a UAV identity according to various embodiments.

FIG. 12 is a process flow diagram illustrating operations 1200 that may be performed as part of the method 1000 for managing a UAV identity according to various embodiments. With reference to FIGS. 1-12, the operations 1200 may be performed by a processor of a base station.

Following the performance of the operations of block 1010 of the method 1000 (FIG. 10) as described, the processor may receive a request to authenticate a UAV message, in which the request includes the assertion and a digital signature associated with the UAV message in block 1202. In some embodiments, the digital signature structure may include message data that has been signed with the digital signature of the UAV. Means for performing the operations of block 1202 may include the processor 312, the modem 320, the transceiver 302, and the RF front end 388 (FIG. 3).

In block 1204, the processor may send to a network computing device a request to authenticate the UAV message, in which the request includes the assertion and the digital signature. Means for performing the operations of block 1204 may include the processor 312, the modem 320, the transceiver 302, and the RF front end 388 (FIG. 3).

In block 1206, the processor may receive a response from the network computing device indicating whether the UAV message is authenticated. Means for performing the operations of block 1206 may include the processor 312, the modem 320, the transceiver 302, and the RF front end 388 (FIG. 3).

In block 1208, the processor may send an indication that the UAV message is authenticated in response to receiving a response from the network computing device indicating that the UAV message is authenticated. Means for performing the operations of block 1208 may include the processor 312, the modem 320, the transceiver 302, and the RF front end 388 (FIG. 3).

FIG. 13 is a component block diagram of a network computing device 1300 suitable for use with various embodiments. Such network computing devices (e.g., the NCD 701) may include at least the components illustrated in FIG. 13. With reference to FIGS. 1-13, the network computing device 1300 may typically include a processor 1301 coupled to volatile memory 1302 and a large capacity nonvolatile memory, such as a disk drive 1308. The network computing device 1300 also may include a peripheral memory access device 1306 such as a floppy disc drive, compact disc (CD) or digital video disc (DVD) drive coupled to the processor 1301. The network computing device 1300 also may include network access ports 1304 (or interfaces) coupled to the processor 1301 for establishing data connections with a network, such as the Internet or a local area network coupled to other system computers and servers. The network computing device 1300 may include one or more antennas 1307 for sending and receiving electromagnetic radiation that may be connected to a wireless communication link. The network computing device 1300 may include additional access ports, such as USB, Firewire, Thunderbolt, and the like for coupling to peripherals, external memory, or other devices.

The processor of the network computing device 1300 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC (e.g., 204) dedicated to wireless communication functions and one processor within an SOC (e.g., 202) dedicated to running other applications. Software applications may be stored in the memory 1302 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a network computing device or a base station including a processor configured with processor-executable instructions to perform operations of the methods of the following implementation examples; the example methods discussed in the following paragraphs implemented by a network computing device or a base station including means for performing functions of the example methods; and the example methods discussed in the following paragraphs implemented as a non-transitory processor-readable storage medium having stored thereon processor-executable instructions configured to cause a processor of a network computing device or a base station to perform the operations of the example methods.

Example 1. A method performed by a processor of a network computing device for managing an unmanned aerial vehicle (UAV) identity, including generating an anonymity token that is associated with a digital certificate of a UAV; providing the anonymity token to the UAV for use in operations; receiving a request to authenticate a UAV message, in which the request includes the anonymity token and a digital signature associated with the UAV message; identifying the digital certificate using the anonymity token included in the request; determining whether the digital signature is verified using the digital certificate; and sending an indication that, the UAV message is authenticated responsive to the request in response to determining that the digital signature is verified using the digital certificate.

Example 2. The method of example 1, in which the anonymity token includes a cryptographically verifiable indication that the anonymity token is associated with the digital certificate.

Example 3. The method of either of examples 1 or 2, in which the anonymity token includes an indication that the UAV is entitled to perform operations anonymously.

Example 4. The method of any of examples 1-3, in which the digital certificate includes an indication that the UAV is entitled to perform operations anonymously.

Example 5. The method of any of examples 1-4, in which the anonymity token is associated with a usability time limitation.

Example 6. The method of any of examples 1-5, in which the anonymity token is associated with a usability geographic limitation.

Example 7. The method of any of examples 1-6, in which the anonymity token includes a hash of the digital certificate.

Example 8. The method of any of examples in which the anonymity token includes a hash of the digital certificate concatenated with a secret value.

Example 9. The method of any of examples 1-8, in which generating the anonymity token that is associated with the digital certificate of the UAV includes generating the anonymity token from one of a hash of the digital certificate, a keyed hash of the digital certificate, or a keyed hash tree of the digital certificate.

Example 10. The method of any of examples 1-9, in which generating the anonymity token that is associated with a digital certificate of a UAV includes generating a plurality of anonymity tokens that are associated with the digital certificate, in which each of the plurality of anonymity tokens is associated with a usability time limitation.; and providing the anonymity token to the UAV for use in operations includes providing the plurality of anonymity tokens to the UAV for use in operations, in which the use of each anonymity token is limited by the respective usability time limitation..

Example 11. The method of example 10, in which generating a plurality of anonymity tokens that are associated with the digital certificate includes generating a plurality of anonymity tokens using a keyed hash tree.

Example 12. A method performed by a processor of a base station for managing an unmanned aerial vehicle (UAV) identity, including receiving from a UAV an assertion that the UAV is entitled to perform operations anonymously; sending to a network computing device a request to authenticate the UAV, in which the request includes the assertion and a digital signature performed over the assertion; receiving a response from the network computing device indicating whether the UAV is entitled to perform operations anonymously; determining whether the UAV is entitled to perform operations anonymously based on the response received from the network computing device; and broadcasting information about the UAV that is configured without identity information of the UAV in response to determining that the UAV is entitled to perform operations anonymously.

Example 13. The method of example 12, in which the assertion includes an anonymity token or digital certificate indicating that the UAV is entitled to perform operations anonymously.

Example 1.4. The method of either of examples 12 or 13, in which the assertion includes a message and an anonymity token, and in which the digital signature is performed over the message and the anonymity token.

Example 15. The method of any of examples 12-114, in which the assertion includes an attribute or a data structure pointer to information indicating that the UAV is entitled to perform operations anonymously.

Example 16. The method of any of examples 12-15, further including receiving a request for an identity of the UAV and configuring a response message that does not include a digital certificate based identity of the UAV based on determining that the UAV is entitled to perform operations anonymously.

Example 17. The method of example 13, in which the anonymity token includes a cryptographically verifiable indication that the anonymity token is associated with a digital certificate of the UAV.

Example 18. The method of example 17, in which the digital certificate encodes information indicating that UAV is entitled to perform operations anonymously.

Example 19. The method of any of examples 12-18, in which the assertion includes an anonymity token that is a product of a cryptographic process and is unambiguously derived from a digital certificate associated with the UAV.

Example 20. The method of any of examples 12-19, in which broadcasting information about the UAV that is configured without identity information of the UAV includes broadcasting one or more pseudonym certificates that are associated with the anonymity token.

Example 21. The method of any of examples 12-20, further including receiving a request to authenticate a UAV message, in which the request includes an anonymity token associated with the UAV and a digital signature associated with the UAV message; sending to a network computing device a request to authenticate the UAV message, in which the request includes the anonymity token and the digital signature; receiving a response from the network computing device indicating whether the UAV message is authenticated; and sending an indication that the UAV message is authenticated in response to receiving a response from the network computing device indicating that the UAV message is authenticated.

Example 22. The method of example 21, in which a structure of the digital signature includes the UAV message data and in which the digital signature has been generated over the UAV message using a private key of the UAV.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 800, 900, 1000, and 1100 may be substituted for or combined with one or more operations of the methods and operations 800, 900, 1000, and 1100.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a network computing device for managing one or more unmanned aerial vehicle (UAV) identities, comprising:
   generating an anonymity token, wherein the anonymity token includes a hash with a secret value concatenated with a digital certificate associated with a UAV, and the anonymity token having an indication that the UAV is entitled to perform operations anonymously, and wherein the digital certificate includes an indication that the UAV is entitled to perform operations anonymously;
   providing the anonymity token to the UAV to enable the UAV for use in anonymous operations, wherein the UAV transmits the anonymity token with a UAV message to a receiver;
   receiving, from the receiver, a request to authenticate the UAV message, wherein the request includes the anonymity token and a digital signature associated with the UAV message;
   identifying the digital certificate using the anonymity token included in the request;
   determining whether the digital signature is verified using the digital certificate; and
   sending an indication that the UAV message is authenticated responsive to the request in response to determining that the digital signature is verified using the digital certificate.

2. The method of claim 1, wherein the anonymity token comprises a cryptographically verifiable indication that the anonymity token is associated with the digital certificate.

3. The method of claim 1, wherein the anonymity token is associated with a usability time limitation.

4. The method of claim 1, wherein the anonymity token is associated with a usability geographic limitation.

5. The method of claim 1, wherein generating the anonymity token that is associated with the digital certificate of the UAV comprises generating the anonymity token from one of a hash of the digital certificate, a keyed hash of the digital certificate, or a keyed hash tree of the digital certificate.

6. The method of claim 1, wherein:
generating the anonymity token that is associated with a digital certificate of a UAV comprises generating a plurality of anonymity tokens that are associated with the digital certificate, wherein each of the plurality of anonymity tokens is associated with a respective usability time limitation; and
providing the anonymity token to the UAV for use in operations comprises providing the plurality of anonymity tokens to the UAV for use in operations, wherein the use of each anonymity token is limited by the respective usability time limitation.

7. The method of claim 6, wherein generating a plurality of anonymity tokens that are associated with the digital certificate comprises generating a plurality of anonymity tokens using a keyed hash tree.

8. A network computing device, comprising:
a processor configured with processor-executable instructions to:
generate an anonymity token, wherein the anonymity token includes a hash with a secret value concatenated with a digital certificate associated with an unmanned aerial vehicle (UAV), and the anonymity token having an indication that the UAV is entitled to perform operations anonymously, and wherein the digital certificate includes an indication that the UAV is entitled to perform operations anonymously;
provide the anonymity token to the UAV to enable the UAV for use in anonymous operations, wherein the UAV transmits the anonymity token with a UAV message to a receiver;
receive, from the receiver, a request to authenticate the UAV message, wherein the request includes the anonymity token and a digital signature associated with the UAV message;
identify the digital certificate using the anonymity token included in the request;
determine whether the digital signature is verified using the digital certificate; and
send an indication that the UAV message is authenticated responsive to the request in response to determining that the digital signature is verified using the digital certificate.

9. The network computing device of claim 8, wherein the processor is further configured with processor-executable instructions such that the anonymity token comprises a cryptographically verifiable indication that the anonymity token is associated with the digital certificate.

10. The network computing device of claim 8, wherein the processor is further configured with processor-executable instructions such that the anonymity token is associated with a usability time limitation.

11. The network computing device of claim 8, wherein the processor is further configured with processor-executable instructions such that the anonymity token is associated with a usability geographic limitation.

12. The network computing device of claim 8, wherein the processor is further configured with processor-executable instructions to generate the anonymity token from one of a hash of the digital certificate, a keyed hash of the digital certificate, or a keyed hash tree of the digital certificate.

13. The network computing device of claim 8, wherein the processor is further configured with processor-executable instructions to:
generate a plurality of anonymity tokens that are associated with the digital certificate, wherein each of the plurality of anonymity tokens is associated with a respective usability time limitation; and
provide the plurality of anonymity tokens to the UAV for use in operations, wherein the use of each anonymity token is limited by the respective usability time limitation.

14. The network computing device of claim 13, wherein the processor is further configured with processor-executable instructions to generate a plurality of anonymity tokens using a keyed hash tree.

15. A network computing device, comprising:
means for generating an anonymity token, wherein the anonymity token includes a hash with a secret value concatenated with a digital certificate associated with an unmanned aerial vehicle (UAV), and the anonymity token having an indication that the UAV is entitled to perform operations anonymously, and wherein the digital certificate includes an indication that the UAV is entitled to perform operations anonymously;
means for providing the anonymity token to the UAV to enable the UAV for use in anonymous operations, wherein the UAV transmits the anonymity token with a UAV message to a receiver;
means for receiving, from the receiver, a request to authenticate the UAV message, wherein the request includes the anonymity token and a digital signature associated with the UAV message;
means for identifying the digital certificate using the anonymity token included in the request;
means for determining whether the digital signature is verified using the digital certificate; and
means for sending an indication that the UAV message is authenticated responsive to the request in response to determining that the digital signature is verified using the digital certificate.

16. The network computing device of claim 15, wherein the anonymity token comprises a cryptographically verifiable indication that the anonymity token is associated with the digital certificate.

17. The network computing device of claim 15, wherein the anonymity token is associated with a usability time limitation.

18. The network computing device of claim 15, wherein the anonymity token is associated with a usability geographic limitation.

19. The network computing device of claim 15, wherein means for generating the anonymity token that is associated with the digital certificate of the UAV comprises means for generating the anonymity token from one of a hash of the digital certificate, a keyed hash of the digital certificate, or a keyed hash tree of the digital certificate.

20. The network computing device of claim 15, wherein:
means for generating the anonymity token that is associated with a digital certificate of a UAV comprises means for generating a plurality of anonymity tokens that are associated with the digital certificate, wherein each of the plurality of anonymity tokens is associated with a respective usability time limitation; and
means for providing the anonymity token to the UAV for use in operations comprises means for providing the plurality of anonymity tokens to the UAV for use in operations, wherein the use of each anonymity token is limited by the respective usability time limitation.

21. The network computing device of claim 20, wherein means for generating a plurality of anonymity tokens that are associated with the digital certificate comprises means for generating a plurality of anonymity tokens using a keyed hash tree.

\* \* \* \* \*